US011352817B2

(12) United States Patent
Gengler et al.

(10) Patent No.: US 11,352,817 B2
(45) Date of Patent: Jun. 7, 2022

(54) ELECTRONIC LOCK AND INTERCHANGEABLE SHACKLES

(71) Applicant: Noke, Inc., Lehi, UT (US)

(72) Inventors: David P. Gengler, Draper, UT (US); Jay Ballard, Mapleton, UT (US); Stephen Willes, Fort Collins, CO (US); Rajiv Mantena, South Jordan, UT (US); Nathan Perry, Eagle Mountain, UT (US); Jacob Gosling, Eagle Mountain, UT (US)

(73) Assignee: NOKE, INC., Lehi, UT (US)

( * ) Notice: Subject to any disclaimer, the term of this patent is extended or adjusted under 35 U.S.C. 154(b) by 805 days.

(21) Appl. No.: 16/258,096

(22) Filed: Jan. 25, 2019

(65) Prior Publication Data

US 2020/0242868 A1 Jul. 30, 2020

(51) Int. Cl.
*E05B 67/06* (2006.01)
*G07C 9/00* (2020.01)
(Continued)

(52) U.S. Cl.
CPC ........ *E05B 67/063* (2013.01); *E05B 47/0001* (2013.01); *E05B 47/0012* (2013.01);
(Continued)

(58) Field of Classification Search
CPC ............ E05B 47/0001; E05B 47/0012; E05B 47/023; E05B 67/06; E05B 67/063;
(Continued)

(56) References Cited

U.S. PATENT DOCUMENTS

| 1,882,794 A | 10/1932 | Full |
| 2,049,416 A | 8/1936 | Aldeen |
| 3,838,395 A | 9/1974 | Suttill |
| 4,386,510 A | 6/1983 | Best |
| 4,499,462 A | 2/1985 | Stoesser |

(Continued)

FOREIGN PATENT DOCUMENTS

| CN | 204002132 | 12/2014 |
| EP | 2607582 | 6/2013 |

(Continued)

OTHER PUBLICATIONS

ActiveKEY, "ActiveKEY User Manual", http://www.supraekey.com/Documents/ActiveKEY_user_manual.pdf, Feb. 2013.

(Continued)

*Primary Examiner* — Christopher J Boswell
(74) *Attorney, Agent, or Firm* — Barnes & Thornburg LLP; Jason Bernstein

(57) ABSTRACT

An electronic lock includes a lock body and a shackle selectively securable via one or more ball bearings. An asymmetric cam can be rotated by a key or an electric motor to: a locked state in which the ball bearing secures the shackle within the lock body via at least one lock notch in the shackle, an unlocked state in which the ball bearing is released from the lock notch to unlock the shackle and subsequently engages a revolved notch on a distal end of the shackle to prevent removal of the shackle from the lock body, and a removal state in which the ball bearing is released from the lock notch and the revolved notch to allow the shackle to be removed from the lock body. A shackle detector can detect a shackle in the locked state. Externally accessible electrical contacts allow for jumpstarting a discharged battery.

18 Claims, 25 Drawing Sheets

(51) Int. Cl.
*E05B 47/00* (2006.01)
*E05B 67/22* (2006.01)
*G06F 3/044* (2006.01)

(52) U.S. Cl.
CPC .............. *E05B 67/22* (2013.01); *G06F 3/044* (2013.01); *G07C 9/00944* (2013.01); *E05B 2047/0017* (2013.01); *E05B 2047/0024* (2013.01); *E05B 2047/0048* (2013.01); *E05B 2047/0058* (2013.01); *E05B 2047/0084* (2013.01); *G07C 2009/00769* (2013.01)

(58) Field of Classification Search
CPC .............. E05B 67/22; E05B 2047/0017; E05B 2047/0024; E05B 2047/0048; E05B 2047/0056; E05B 2047/0057; E05B 2047/0058; E05B 2047/0084; E05B 2047/0085; G07C 9/00563; G07C 9/00944; G07C 2009/00769; G06F 3/044
See application file for complete search history.

(56) References Cited

U.S. PATENT DOCUMENTS

| | | | |
|---|---|---|---|
| 5,377,511 A * | 1/1995 | Meckbach | E05B 67/24 70/389 |
| 5,646,605 A | 7/1997 | Leonaggeo | |
| 6,411,195 B1 | 6/2002 | Goldman | |
| 6,442,983 B1 | 9/2002 | Thomas | |
| 6,505,774 B1 | 1/2003 | Fulcher | |
| 6,604,394 B2 | 8/2003 | Davis | |
| 6,898,952 B1 | 5/2005 | Lin | |
| 6,989,732 B2 | 1/2006 | Fisher | |
| 7,021,092 B2 | 4/2006 | Loughlin | |
| 7,036,344 B2 * | 5/2006 | Gast | E05B 67/24 70/38 R |
| 7,236,085 B1 | 6/2007 | Aronson | |
| 7,423,515 B1 | 9/2008 | Fiske | |
| 7,856,855 B2 * | 12/2010 | Fantl | E05B 67/24 70/38 A |
| 7,921,682 B1 | 4/2011 | Chang | |
| 7,948,359 B2 * | 5/2011 | Marcelle | E05B 47/0012 70/38 A |
| 8,274,365 B2 | 7/2012 | Piccirillo | |
| 8,477,011 B2 | 7/2013 | Tubb | |
| 8,633,799 B1 | 1/2014 | Aronson | |
| 8,791,790 B2 | 7/2014 | Robertson | |
| 8,850,858 B2 | 10/2014 | Nave | |
| 8,875,550 B1 | 11/2014 | Spunt | |
| 8,881,558 B2 | 11/2014 | Misner | |
| 8,919,024 B2 | 12/2014 | Milde | |
| 8,922,333 B1 | 12/2014 | Kirkjan | |
| 9,057,210 B2 | 6/2015 | Dumas | |
| 9,077,716 B2 | 7/2015 | Myers | |
| 9,109,379 B1 | 8/2015 | Ranchod | |
| 9,115,511 B1 | 8/2015 | Schmidt | |
| 9,121,199 B2 | 9/2015 | Li | |
| 9,437,062 B2 | 9/2016 | Ahearn | |
| 9,495,820 B1 | 11/2016 | Li | |
| 9,556,651 B1 * | 1/2017 | Cabral Herrera | E05B 67/22 |
| 9,689,179 B2 * | 6/2017 | Fan | E05B 67/22 |
| 9,728,022 B2 | 8/2017 | Gengler | |
| 9,747,739 B2 | 8/2017 | Gengler | |
| 9,784,016 B1 * | 10/2017 | Cabral Herrera | E05B 67/22 |
| 10,125,519 B1 | 11/2018 | Gengler | |
| 10,176,656 B2 | 1/2019 | Gengler | |
| 10,210,686 B2 | 2/2019 | Gengler | |
| 10,422,163 B1 * | 9/2019 | Cabral Herrera | E05B 47/0012 |
| 11,028,618 B1 * | 6/2021 | Liu | E05B 67/22 |
| 11,193,309 B1 * | 12/2021 | Cabral Herrera | E05B 67/22 |
| 2002/0088256 A1 | 7/2002 | Taylor | |
| 2003/0011719 A1 | 1/2003 | Jang | |
| 2003/0016847 A1 | 1/2003 | Quintana | |
| 2004/0064309 A1 | 4/2004 | Kosai | |
| 2004/0108938 A1 | 6/2004 | Entrekin | |
| 2005/0099262 A1 | 5/2005 | Childress | |
| 2005/0201076 A1 | 9/2005 | Marcelle | |
| 2005/0210283 A1 | 9/2005 | Kato | |
| 2005/0213441 A1 | 9/2005 | Voltz | |
| 2006/0016230 A1 | 1/2006 | Loughlin et al. | |
| 2006/0096343 A1 | 5/2006 | Loughlin et al. | |
| 2006/0061549 A1 | 6/2006 | Chen | |
| 2006/0179903 A1 | 8/2006 | Goldman | |
| 2006/0283216 A1 | 12/2006 | Marcelle | |
| 2006/0288744 A1 | 12/2006 | Smith | |
| 2007/0017977 A1 | 1/2007 | Ueda | |
| 2007/0126551 A1 | 6/2007 | Slevin | |
| 2007/0132552 A1 | 6/2007 | Kurpinski | |
| 2007/0216764 A1 | 9/2007 | Kwak | |
| 2007/0229257 A1 | 10/2007 | Bliding | |
| 2008/0024272 A1 | 1/2008 | Fiske | |
| 2008/0047783 A1 | 2/2008 | Vogl | |
| 2008/0068128 A1 | 3/2008 | Ghabra | |
| 2008/0072637 A1 | 3/2008 | Padilla et al. | |
| 2008/0100417 A1 | 5/2008 | Hata | |
| 2008/0118014 A1 | 5/2008 | Reunamaki | |
| 2008/0129473 A1 | 6/2008 | Tsuruta | |
| 2008/0136587 A1 | 6/2008 | Orr | |
| 2008/0215841 A1 | 9/2008 | Bolotin | |
| 2008/0230086 A1 | 9/2008 | Murphy | |
| 2008/0252415 A1 | 10/2008 | Larson | |
| 2009/0153291 A1 | 6/2009 | Larson | |
| 2009/0189747 A1 | 7/2009 | Baier | |
| 2009/0256676 A1 | 10/2009 | Piccirillo | |
| 2009/0261945 A1 | 10/2009 | Ko | |
| 2009/0280862 A1 | 11/2009 | Loughlin et al. | |
| 2009/0312051 A1 | 12/2009 | Hansson | |
| 2010/0053861 A1 | 3/2010 | Kim | |
| 2010/0073129 A1 | 3/2010 | Pukari | |
| 2010/0083713 A1 | 4/2010 | Woodling | |
| 2010/0158327 A1 | 6/2010 | Kangas | |
| 2010/0166207 A1 | 7/2010 | Masuyama | |
| 2010/0194527 A1 | 8/2010 | Loughlin et al. | |
| 2010/0222940 A1 | 9/2010 | Putsch | |
| 2010/0245289 A1 | 9/2010 | Svajda | |
| 2010/0306718 A1 | 12/2010 | Shim | |
| 2011/0001603 A1 | 1/2011 | Willis | |
| 2011/0090047 A1 | 4/2011 | Patel | |
| 2011/0259063 A1 | 10/2011 | Foti | |
| 2011/0265526 A1 | 11/2011 | Zuraski | |
| 2012/0011902 A1 | 1/2012 | Meekma | |
| 2012/0186308 A1 | 7/2012 | Garthe | |
| 2012/0229251 A1 | 9/2012 | Ufkes | |
| 2012/0280783 A1 | 11/2012 | Gerhardt | |
| 2012/0306748 A1 | 12/2012 | Fleizach | |
| 2012/0324967 A1 | 12/2012 | Goren | |
| 2012/0324968 A1 | 12/2012 | Goren | |
| 2013/0014552 A1 | 1/2013 | Bench | |
| 2013/0021273 A1 | 1/2013 | Lee | |
| 2013/0055773 A1 | 3/2013 | Li | |
| 2013/0076206 A1 | 3/2013 | Rosenberg | |
| 2013/0099893 A1 | 4/2013 | Kulinets | |
| 2013/0110264 A1 | 5/2013 | Weast | |
| 2013/0118216 A1 | 5/2013 | Kalous | |
| 2013/0127706 A1 | 5/2013 | Hsu | |
| 2013/0169549 A1 | 7/2013 | Seymour | |
| 2013/0203348 A1 | 8/2013 | Lim | |
| 2013/0257590 A1 | 10/2013 | Kuenzi | |
| 2013/0257716 A1 | 10/2013 | Xin | |
| 2013/0293368 A1 | 11/2013 | Ottah | |
| 2013/0298616 A1 | 11/2013 | Ullrich | |
| 2013/0312956 A1 | 11/2013 | Weston et al. | |
| 2013/0332848 A1 | 12/2013 | Lam | |
| 2013/0335193 A1 | 12/2013 | Hanson | |
| 2013/0342314 A1 | 12/2013 | Chen | |
| 2014/0015737 A1 | 1/2014 | Inoue | |
| 2014/0028443 A1 | 1/2014 | Ebner | |
| 2014/0056033 A1 | 2/2014 | Woo | |
| 2014/0077929 A1 | 3/2014 | Dumas | |
| 2014/0109631 A1 | 4/2014 | Asquith | |
| 2014/0113563 A1 | 4/2014 | Almonani | |
| 2014/0150502 A1 | 6/2014 | Duncan | |
| 2014/0195841 A1 | 7/2014 | Lee | |

(56) References Cited

U.S. PATENT DOCUMENTS

| | | | |
|---|---|---|---|
| 2014/0210592 A1 | 7/2014 | Van Wiemeersch |
| 2014/0218167 A1 | 8/2014 | Tseng |
| 2014/0250954 A1 | 9/2014 | Buzhardt |
| 2014/0260452 A1 | 9/2014 | Chen |
| 2014/0265359 A1 | 9/2014 | Cheng |
| 2014/0266588 A1 | 9/2014 | Majzoobi |
| 2014/0292481 A1 | 10/2014 | Dumas |
| 2014/0310653 A1 | 10/2014 | Han |
| 2014/0326027 A1 | 11/2014 | Avganim |
| 2014/0360232 A1 | 12/2014 | Al-Kahwati |
| 2014/0375422 A1 | 12/2014 | Huber |
| 2015/0076989 A1 | 3/2015 | Walma |
| 2015/0102902 A1 | 4/2015 | Chen |
| 2015/0120151 A1 | 4/2015 | Akay |
| 2015/0143260 A1 | 5/2015 | Bailey |
| 2015/0168099 A1 | 6/2015 | Hyde |
| 2015/0170447 A1 | 6/2015 | Buzhardt |
| 2015/0178532 A1 | 6/2015 | Brule |
| 2015/0220918 A1 | 8/2015 | Davis et al. |
| 2015/0225986 A1 | 8/2015 | Goldman |
| 2015/0240531 A1 | 8/2015 | Blust |
| 2015/0278124 A1 | 10/2015 | Bolotin |
| 2015/0292244 A1 | 10/2015 | Beatty |
| 2016/0002953 A1 | 1/2016 | Sada |
| 2016/0035163 A1 | 2/2016 | Conrad |
| 2016/0042582 A1 | 2/2016 | Hyde |
| 2016/0047142 A1 | 2/2016 | Gengler |
| 2016/0049032 A1 | 2/2016 | Ranchod |
| 2016/0142093 A1 | 5/2016 | Phang |
| 2016/0217637 A1 | 7/2016 | Gengler |
| 2016/0299680 A1 | 10/2016 | Polyulya |
| 2016/0330244 A1 | 11/2016 | Denton |
| 2017/0268260 A1 | 9/2017 | McGinnis |
| 2017/0314293 A1 | 11/2017 | Scheffler et al. |
| 2018/0096549 A1 | 4/2018 | Tseng |
| 2018/0112437 A1 | 4/2018 | Chow |
| 2018/0165901 A1 | 6/2018 | Lai |
| 2018/0215841 A1 | 8/2018 | Al-Assaf et al. |
| 2019/0156607 A1* | 5/2019 | Tao ................... E05B 67/22 |
| 2020/0291684 A1* | 9/2020 | Kinas ................. E05B 47/0012 |
| 2021/0324662 A1* | 10/2021 | Ng .................... E05B 67/22 |

FOREIGN PATENT DOCUMENTS

| | | |
|---|---|---|
| KR | 20100049321 | 5/2010 |
| WO | WO2007020574 | 2/2007 |
| WO | WO2013170292 | 11/2013 |
| WO | WO2013189721 | 12/2013 |
| WO | WO 2016/130386 | 8/2016 |

OTHER PUBLICATIONS

AMADAS, "AMADAS Smart Lock: The Truly UserCentric", Per Kickstarter Jul. 2014 Idea & design; Protoype in Jan. 2015; (not availableon Wayback Machine) https://www.kickstarter.com/projects/2033716885/amadas-smart-lockthe-truly-user-centricsecurity? ref=nav_search, Jul. 31, 2014.

BitLock, "Toss your bike key with BitLock Bluetooth lock", https://www.cnet.com/news/toss-your-bike-key-with-bitlock-bluetoothlock/, Oct. 15, 2013.

Ha, "Are Smart Locks Secure, or Just Dumb?", http://gizmodo.com/aresmart-locks-secure-or-just-dumb-511093690, Jun. 5, 2013.

Lockitron, "Lockitron turns your smartphone into a house key", http://newatlas.com/lockitron-turns-yoursmartphone-into-a-housekey/24422/, Oct. 4, 2012.

Padlock Evolution, "The padlock evolution", From ProQuest, Apr. 1999.

PR100, "PR100", http://www.assaabloyamericasuniversity.com/Other/AssaAbloyAmericasUniv/Lesson%20Resources/SARAperioHowToOrder/PR100%20Catalog%20For%20Training.pdf, 2012.

Ritchie et al, "The future of authentication: Biometrics, multi-factor, and co-dependency", http://web.archive.org/web/20131210115341/http://www.androidcentral.com/talk-mobile/future-authentication-biometrics-multi-factor-and-codependency-talk-mobile, Dec. 10, 2013.

Saluki, "Project Proposal Generic Wireless Lock",http://www.engr.siu.edu/ugrad/me495a/S13-GLCK/Documentation/[495]%20Proposal%20s13_44_GLCK_2nd.pdf, May 2, 2013.

ShareKey, "ShareKey smartphone app replaces your house keys", http://newatlas.com/sharekey-smartphone-nfc-house-keys/25653/, Jan. 6, 2013.

Skylock, "Meet Skylock", http://web.archive.org/web/20140712040738/https://skylock.cc, Jul. 12, 2004.

Skylock2, "Skylock bike lock uses the power of the sun to thwart thieves and connect to riders", http://newatlas.com/skylock-solarpowered-bike-lock/32157/, May 20, 2014.

SupraeKEY, "Real-Time Wireless Key Management", http://www.supraekey.com/Documents/Realtime_Wireless.pdf, 2010.

Teo, "Teo Bluetooth Padlock lets you secure school lockers, chains & gates with Apple's iPhone", http://appleinsider.com/articles/14/01/11/teobluetooth-padlock-lets-you-secure-school-lockers-chains-gates-withapples-iphone, Jan. 11, 2014.

Todorovic, "Lockbox realtor's dream", From ProQuest, Sep. 17, 2005.

UniKey, "UniKey replaces physical door lock key with an app", http://newatlas.com/unikey-door-lock-app/22635/, May 22, 2012.

Paoli, "Betty Brachman's connections", From Proquest, Oct. 8, 2000.

Woollaston, "The smart lock that lets you open your front door using just your phone—and can even let in guests when you're not home", http://www.dailymail.co.uk/sciencetech/article-2333375/The-smart-locklets-open-door-using-just-phone--let-guests-youre-home.html, May 30, 2013.

YouTube, "2 Factor Authentication Lock", https://www.youtube.com/watch?v=qm7NaEbcoLA, Dec. 3, 2013.

PCT International Search Report; International App. No. PCT/US2015/045541; dated Jan. 12, 2016.

USPTO Notice of Allowance; U.S. Appl. No. 14/610,578; dated Jun. 16, 2017.

USPTO Non-final Office Action; U.S. Appl. No. 14/610,578; dated Dec. 14, 2016.

USPTO Non-final Office Action; U.S. Appl. No. 14/610,578; dated Apr. 15, 2016.

USPTO Non-final Office Action; U.S. Appl. No. 14/610,578; dated Apr. 8, 2015.

USPTO Final Office Action; U.S. Appl. No. 14/610,578; dated Nov. 19, 2015.

USPTO Final Office Action; U.S. Appl. No. 14/610,578; dated Jul. 29, 2016.

USPTO Non-final Office Action; U.S. Appl. No. 15/009,640; dated Dec. 22, 2016.

USPTO Notice of Allowance; U.S. Appl. No. 15/009,640; dated Jun. 15, 2017.

U.S. Appl. No. 15/669,811, Non-Final Office Action dated Dec. 29, 2017.

U.S. Appl. No. 15/669,811, Final Office Action dated Sep. 28, 2018.

U.S. Appl. No. 15/832,348, Non-Final Office Action dated Apr. 25, 2018.

U.S. Appl. No. 15/669,811, Notice of Allowance dated Dec. 13, 2018.

PCT Application No. PCT/US2018/062054, Written Opinion dated Jan. 28, 2019, p. 1-9.

PCT Application No. PCT/US2018/062054, International Search Report dated Jan. 28, 2019, p. 1-2.

U.S. Appl. No. 15/669,807, Notice of Allowance dated Oct. 17, 2018.

U.S. Appl. No. 15/669,807, Final Office Action dated Jul. 17, 2018.

U.S. Appl. No. 15/669,807, Non-Final Office Action dated Dec. 28, 2017.

U.S. Appl. No. 16/196,548, Non-Final Office Action dated Feb. 21, 2019.

* cited by examiner

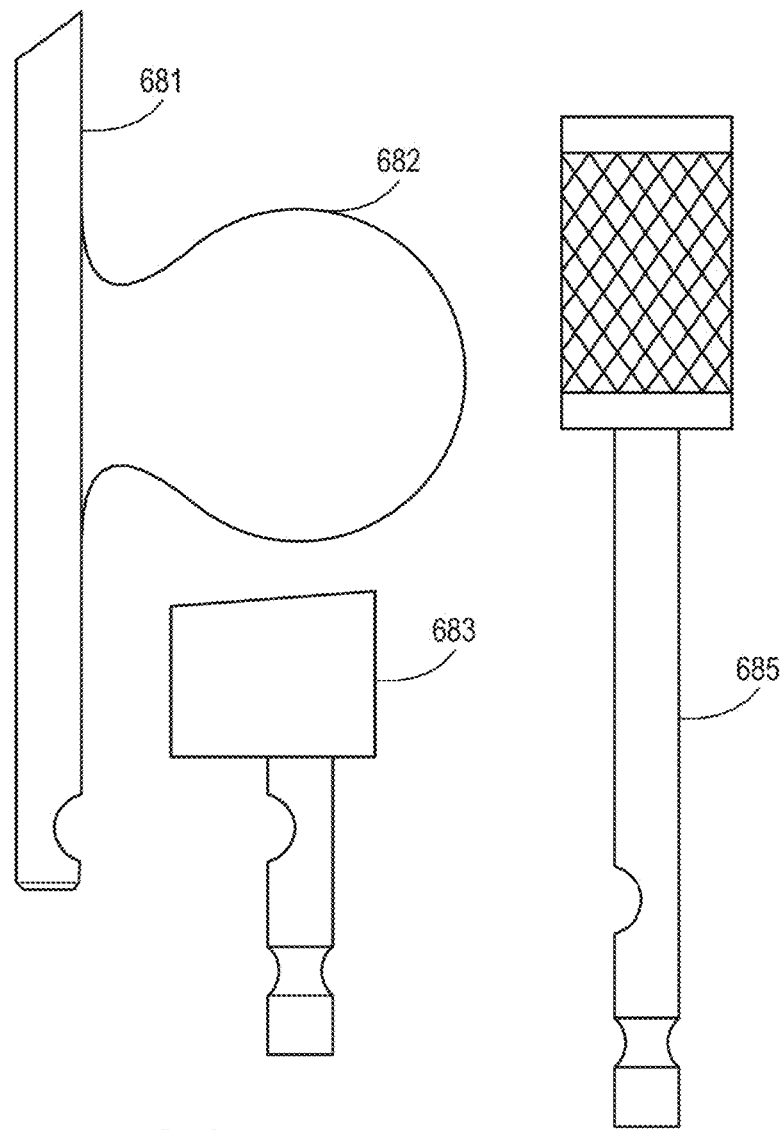
FIG. 6F
FIG. 6G
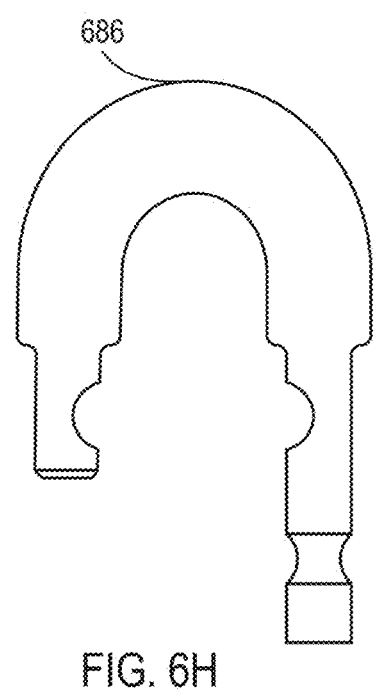
FIG. 6H

ELECTRONIC LOCK AND INTERCHANGEABLE SHACKLES

TECHNICAL FIELD

This disclosure generally relates to electronic locks, including padlocks and variations thereof.

BRIEF DESCRIPTION OF THE DRAWINGS

Non-limiting and non-exhaustive embodiments of the disclosure are described herein, including various embodiments of the disclosure with reference to the figures listed below.

FIG. 6F illustrates a hitch ball lock assembly that can be used interchangeably with the other shackles compatible with the various lock bodies described herein.

FIG. 6G illustrates a hitch receiver lock assembly that can be used interchangeably with the other shackles compatible with the various lock bodies described herein.

FIG. 6H illustrates an oversized shackle with tapered ends for compatibility with the various lock bodies described herein.

DETAILED DESCRIPTION

Figure 1A:
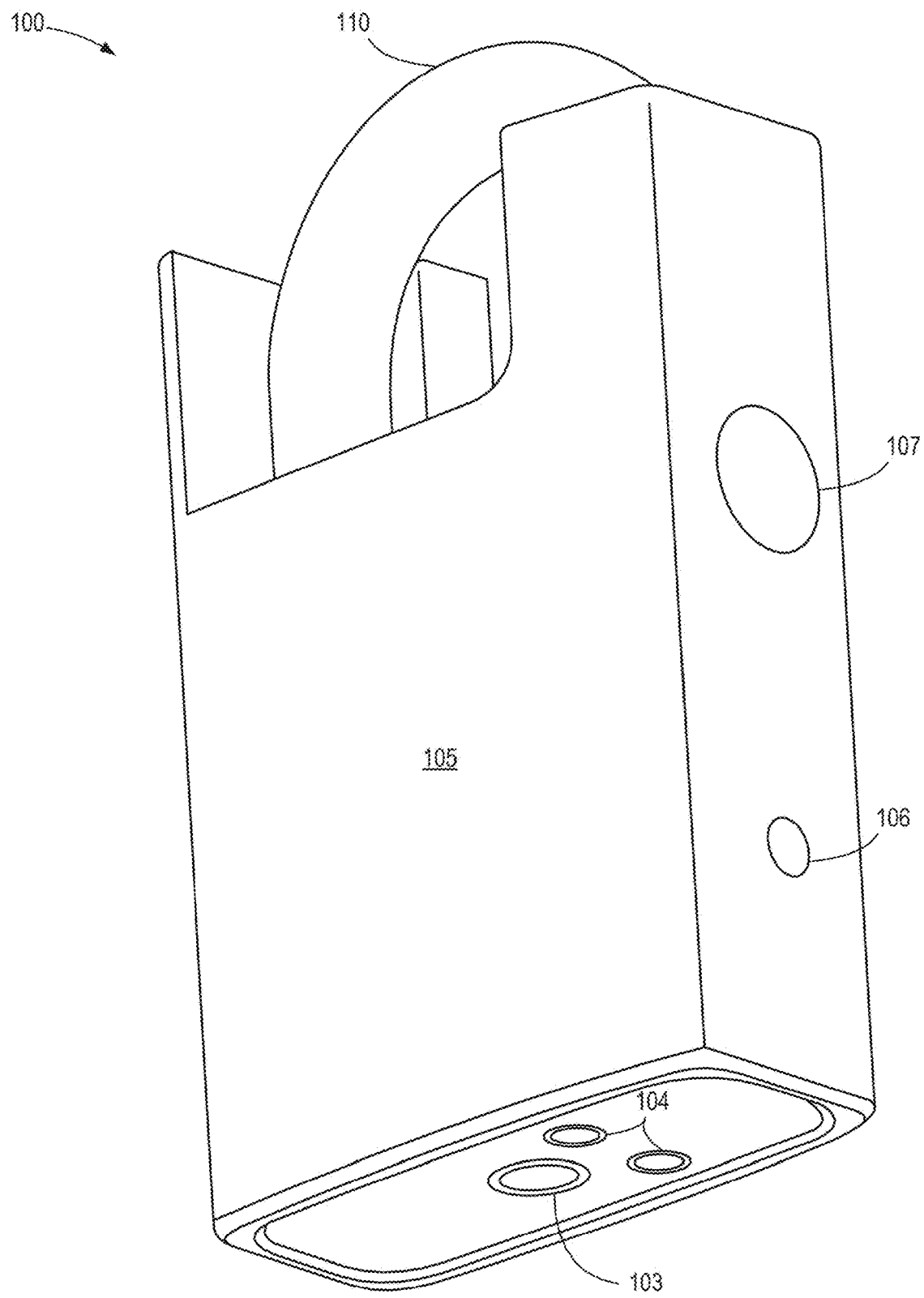
FIG. 1A illustrates a keyless electronic lock with a removable shackle and a touch input sensor, according to one embodiment.

Various lock assemblies and interchangeable shackles are described herein. In various embodiments, a lock includes a lock body and a shackle to be selectively locked, unlocked, and removed from the lock body. One or two ball bearings may be positioned via an asymmetric cam to lock the shackle, unlock the shackle, or allow the shackle to be removed from the lock body. The asymmetrical shackle can be transitioned between a locked state in which the ball bearing secures the shackle within the lock body via at least one lock notch in the shackle, an unlocked state in which the ball bearing is released from the lock notch to unlock the shackle and engage a revolved notch on a distal end of the shackle to prevent removal of the shackle from the lock body, and a removal state in which the ball bearing is released from the lock notch and the revolved notch to allow the shackle to be removed from the lock body.

A lock assembly may be embodied as a wireless lock assembly (e.g., Bluetooth, NFC, WiFi, etc.) or as a keyed assembly rotatable via a standard key (e.g., a metal key). The lock may be controllable via software to enable users and control access privileges. For instance, standard users may be allowed to unlock the electronic lock, while admin users may also be allowed to selectively remove the shackle.

In some embodiments, a lock may include a touch sensor, such as a capacitive touch sensor, that can be used to unlock the lock. For example, a capacitive touch sensor may receive a pattern of short and long actuations. A correctly input pattern is received and confirmed by control circuitry that causes a motor to rotate the asymmetric cam from the locked state to the unlocked state. An incorrect input pattern will not unlock the lock. In some embodiments, a removal input pattern different from an unlock input pattern can be input to allow the shackle to be removed from the lock body.

The motor may be embodied as, for example, a stepper motor, servo motor, or another type of commutator-based electrically switched device to provide rotation. Other types of electrically controlled rotational devices may also be used. In some embodiments, a clutch controlled by the control circuitry may selectively engage and disengage gears associated with the motor to prevent gear stripping and breakage thereof. In other embodiments, a clutch system may selectively connect a motor to a shaft of the asymmetric cam. In such an embodiment, the clutch system can prevent damage to the motor and/or associated gears from forced rotation or torque on the asymmetric cam.

In various embodiments, one or more sensors or switches may be employed to determine a current location and/or rotational position of the shackle and/or the asymmetrical cam. For example, one or more sensors or switches may detect that the asymmetrical cam is currently in a locked state and that information may be used by the electronic lock to determine a next state and/or reported back to a device executing control or reporting software.

The shackle can be replaced with a replacement shackle having a base portion and a tapered portion. The base portion of the replacement shackle may have a diameter, lock notch, and revolved notch similar to that of the standard shackle. A tapered portion of the replacement shackle may have a narrower diameter for locking applications in which a narrow-diameter shackle is useful.

The electronic lock may include externally accessible electrical contacts to enable an external battery to be directly connected to the electronic lock to provide power to the control circuitry and motor when the internal battery is discharged. This feature may be referred to as a "jumpstart" feature. For example, an electronic lock may include circuitry and electrical contacts to receive connectors from a nine-volt battery in either polarity. An electronic lock with a discharged battery may not be unlockable without power to authenticate a wireless signal or detect a capacitive input series. Furthermore, the motor may not rotate the asymmetric cam without power. A fully discharged lock may be jumpstarted using a nine-volt battery and unlocked.

Once unlocked (or in some embodiments, once the shackle is removed), the internal battery may be removed and replaced. While any of a wide variety of batteries or other power sources may be used, examples of suitable batteries include half-AA batteries and CR2 batteries.

In some embodiments, the lock body may include shackle shrouds and/or a detector to detect when the shackle is inserted within the lock body in the locked state. For example, a shackle may include a magnetic element in a distal end. A shackle detector may be embodied as circuitry to detect the magnetic element in the shackle. The lock body may be compatible with various interchangeable shackles of various widths, diameters, shapes, sizes, lengths, etc. A shackle that has a narrower diameter may be paired with a spacer to ensure a tight fit within the receiving aperture of the lock body. In some embodiments, the shackle detector may be configured to read data from a shackle to determine the type of shackle as well. For example, each shackle may include NFC, RFID, or magnetically encoded data indicating the type, length, diameter, etc. of shackle being used.

Electronic components of a keyless electronic lock may be housed inside of a lock body. The lock body also houses mechanical locking components. A locking shackle (referred to herein as a "shackle") may be U-shaped, straight, squared-corner U-shaped, or have various bends and curves outside of the lock body as may be useful for a particular locking application.

The lock body may be manufactured using any of a wide variety of materials, such as hardened steel, Boron alloys, Tungsten, Titanium, carbides, or combinations thereof. Variants of the lock body may have extended flanges to help guard the shackle ("shackle shrouds"). The lock body may be rectangular, circular, or another shape to fit a specific design goal or locking application.

The lock body may include weep holes to allow moisture (e.g., condensation, rainwater, irrigation water, etc.) to drain from interior portions of the lock body. The weep holes may, for example, be located proximate the base of the shackle. Various other thru-holes may exist on the lock body to allow access to disassemble the lock. In various embodiments, the lock body includes a baseplate that may be selectively removed via one or more screws that are only accessible when the shackle is removed from the lock body. The baseplate may be used to seal the electrical and mechanical components within the lock body. Depending on the gaskets used and machine tolerances of the mechanical interfaces, the lock may be rated as weather sealed, waterproof, hermetically sealed, etc.

Some embodiments of electronic locks described herein use a fixed, non-removable shackle. Other embodiments of electronic locks described herein may be used with any one of a plurality of interchangeable shackles. Various shackles may be asymmetric in terms of the shackle terminations. One termination side of a shackle may be longer to allow the shackle to slide out and open. The other termination side of the shackle may be shorter so that it can be disengaged from the lock body in the unlocked state.

The modular design of the electronic lock allows the electronic components and/or mechanical components to be modularly replaced, exchanged, or upgraded while re-using the lock body. The modular design may facilitate less costly repair and/or refurbishment.

Many of the embodiments described herein may be implemented without the use of a standard key (e.g., a metal key with ridges or grooves). Instead, an electronic lock may rely on a wireless signal input or pattern-based authentication input. In some embodiments, a standard key may also be utilized as a backup. While most of the embodiments described herein relate to keyless electronic locks, standard key locks or combination locks may utilize the asymmetric cam described herein to allow for rotation in one direction to unlock the lock and rotation in the other direction to remove the shackle.

When the lock is transitioned to a locked state (e.g., via a touch input, Bluetooth signal, etc.), a motor may rotate the asymmetric cam to a locked state. Rotation of the asymmetric cam to the locked state directs ball bearings into the lock notches of the shackle. With the ball bearings directed into the lock notches of the shackle, the shackle cannot be removed from the lock body. When the lock is transitioned to an unlocked state, the motor may rotate the asymmetric cam to an unlocked state. Rotation of the asymmetric cam to the unlocked state frees the ball bearings and allows them to disengage from the lock notches of the shackle. In the unlocked state, the short side of the shackle can be released from the lock body, while the ball bearing still retains the long side of the shackle. That is, the ball bearing is sufficiently freed in the unlocked state to disengage from the lock notch and slide along a small vertical groove in the shackle between the lock notch and the revolved notch. The ball bearing engages the revolved notch and retains the long side of the shackle within the lock body.

In various embodiments, if the asymmetric cam is rotated in the other direction (or 180 degrees relative to the unlocked position), the ball bearings are sufficiently freed to allow the shackle to be completely removed from the lock body. Accordingly, the shackle can be completely removed from the lock body without the use of any tools or disassembly of the lock body or shackle itself.

A number of variations of asymmetric cams are possible. In a mechanically simple embodiment, the asymmetric cam may comprise a rectangular prism with a shaft connected off-center. In other embodiments, the asymmetric cam may be a cylindrical shape with concave recesses on opposing sides. One concave recess may have a small convex projection centered in the concave recess, while the opposing concave recess may have a larger convex projection centered in the concave recess. The illustrations may facilitate a clearer understanding of this configuration. The motor may rotate the asymmetrical cam via a shaft connected to the center of the asymmetric cam or off-center.

As previously described and as described below in greater detail, the asymmetric cam may be transitioned between three positions. In a first position, the asymmetric cam is in a locked state with the cam notches positioned orthogonally to the corresponding lock notches in the shackle. The ball bearings are forced into the lock notches of the shackle to completely stop movement of the shackle. In the second position, the cam is in a locked state with the cam rotated so that the notches in the asymmetric cam are aligned with the corresponding lock notches of the shackle. The side of the cam with the concave recess having the larger convex projection faces the long side of the shackle, while the side of the cam with the concave recess having the smaller convex projection faces the short side of the shackle.

In the unlocked state, the larger convex projection allows the ball bearing to be freed sufficiently to allow the shackle to be unlocked, but not removed. In a third position, the asymmetric cam allows the cam to rotate to align the cam notch with the smaller convex projection with the long side of the shackle. In this position, the shackle can be removed from the lock body.

Some of the infrastructure that can be used with embodiments disclosed herein is already available, such as general-purpose computers, computer programming tools and techniques, digital storage media, and communications networks. A computer may include a processor, such as a microprocessor, microcontroller, logic circuitry, or the like. The processor may include a special-purpose processing device, such as an ASIC, a PAL, a PLA, a PLD, a CPLD, a Field Programmable Gate Array (FPGA), or other customized or programmable device. The computer may also include a computer-readable storage device, such as non-volatile memory, static RAM, dynamic RAM, ROM, CD-ROM, disk, tape, magnetic memory, optical memory, flash memory, or another computer-readable storage medium.

Suitable networks for configuration and/or use, as described herein, include any of a wide variety of network infrastructures. Specifically, a network may incorporate landlines, wireless communication, optical connections, various modulators, demodulators, small form-factor pluggable (SFP) transceivers, routers, hubs, switches, and/or other networking equipment. Networks and wireless communication generally encompass a wide range of electromagnetic radiation communications frequency bands, modulation protocols, encoding, encrypting, communication protocols and hardware protocols.

Examples of suitable protocols and technologies include, but are not limited to, 802.xx protocols (e.g., Wi-Fi), Bluetooth protocols, near-field communication (NFC) protocols, radio frequency identification (RFID) protocols, Zig-Bee, Z-wave, BACnet, 6LoWPAN, RPL, CoAP, cellular protocols (e.g., 4G LTE), Thread, Sigfox, Neul, LoRaWAN, and/or various protocols using the ISM bands in the U.S., SRD bands in Europe, and the like in other jurisdictions.

Related networks may also include communications or networking software, such as software available from Novell, Microsoft, Artisoft, and other vendors, and may operate using TCP/IP, SPX, IPX, SONET, and other protocols over twisted pair, coaxial, or optical fiber cables, telephone lines, satellites, microwave relays, modulated AC power lines, physical media transfer, wireless radio links, and/or other data transmission "wires." The network may encompass smaller networks and/or be connectable to other networks through a gateway or similar mechanism. In some embodiments, virtual networks and software-defined networks may be utilized.

Aspects of certain embodiments described herein may be implemented as software modules or components. As used herein, a software module or component may include any type of computer instruction or computer executable code located within or on a computer-readable storage medium, such as a non-transitory computer-readable medium. A software module may, for instance, include one or more physical or logical blocks of computer instructions, which may be organized as a routine, program, object, component, data structure, etc., that perform one or more tasks or implement particular data types, algorithms, and/or methods.

Various compatible embodiments, data structures, systems, network configurations, and functionalities of wireless-enabled locks can be adapted for use with the various embodiments of keyless electronic locks described herein, including without limitation and to the extent consistent herewith, the embodiments described in U.S. patent application Ser. No. 15/009,640 filed on Jan. 28, 2016, titled Electronic Padlocks and Related Methods, which application is hereby incorporated by reference in its entirety and/or partially included in the appendices attached hereto.

A particular software module may comprise disparate instructions stored in different locations of a computer-readable storage medium, which together implement the described functionality of the module. Indeed, a module may comprise a single instruction or many instructions and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

Some of the embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Further, those of skill in the art will recognize that one or more of the specific details may be omitted, or other methods, components, or materials may be used. In some cases, operations are not shown or described in detail. Thus, the following detailed description of the embodiments of the systems and methods of the disclosure is not intended to limit the scope of the disclosure, as claimed, but is merely representative of possible embodiments.

The following U.S. patent applications are incorporated by reference in their entireties to the extent that they are not inconsistent herewith: U.S. patent application Ser. No. 16/196,548 filed on Nov. 20, 2018 titled Wireless Locking Device, U.S. patent application Ser. No. 15/669,811 filed on Aug. 4, 2017 titled Electronic Padlocks and Related Methods, and U.S. patent application Ser. No. 16/176,736 filed on Oct. 31, 2018 titled Wireless-Enabled Interchangeable Locking Core. Many of the features, embodiments, software programs and components of the locking devices described in the above-referenced U.S. patent applications may be incorporated into the embodiments described herein.

FIG. 1A illustrates a keyless electronic lock 100 with a removable shackle 110. The removable shackle 110 is partly shrouded by shackle shroud of a lock body 105. A weep or access hole 107 allows moisture and/or debris to escape from an aperture in the lock body 105 that receives a secured end of the shackle 110. Weep or access hold 107 may also be used to allow for a tool to access internal components when the shackle 110 is removed. A thru-bore 106 allows for a tool to be inserted into the lock body 105 when the shackle 110 is removed. Thru-bore 106 may also function as a weep hole to allow moisture and/or debris to escape from the aperture in the lock body 105 that receives a secured end of the shackle 110. A pair of contact terminals 104 allows the internal electrical components to be "jump started" via an external battery in the event of that the internal power supply is discharged. An external sensor 103 may be a touch sensor, such as a capacitive or resistive sensor, to receive an input code to actuate the electronic lock.

Figure 1B:
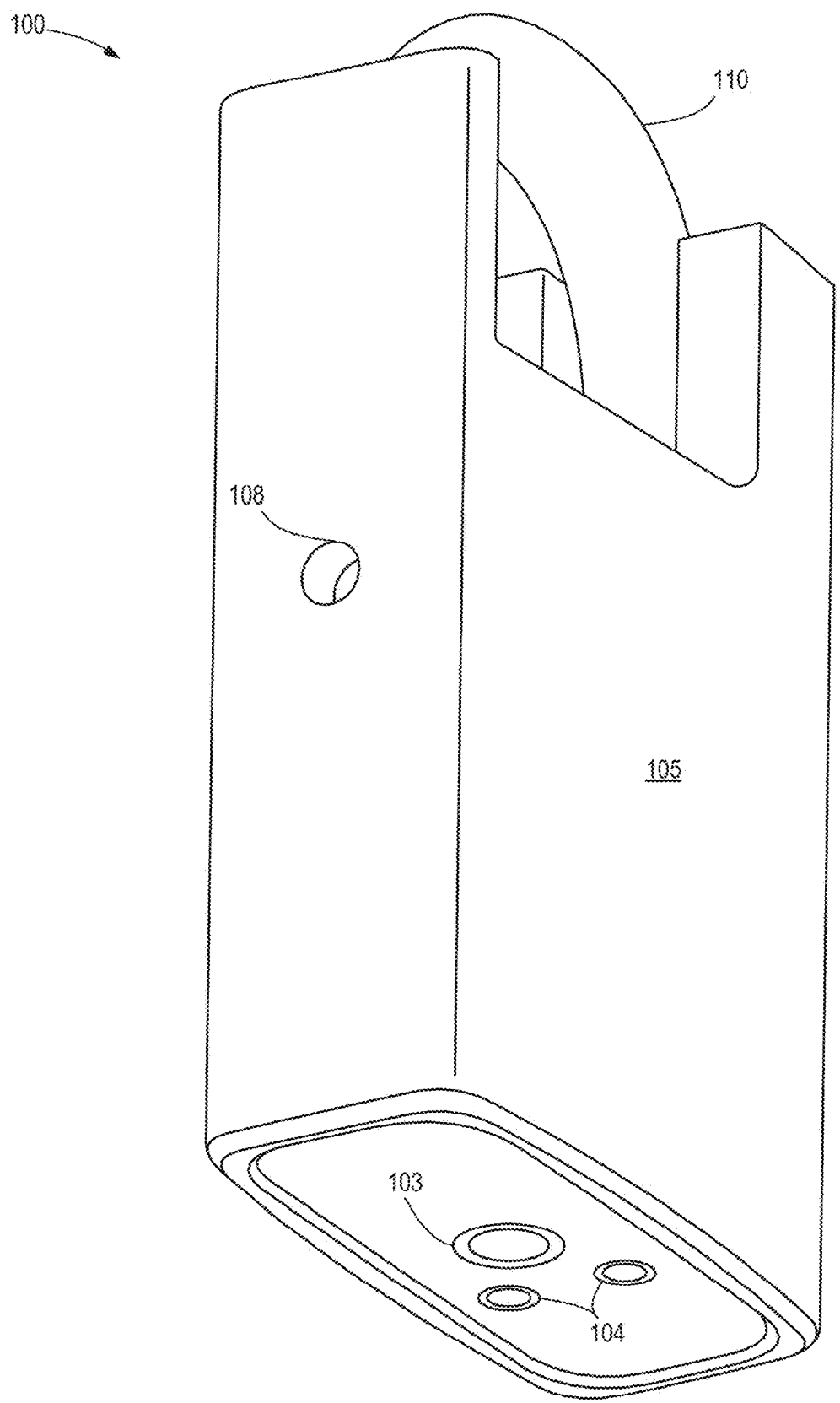
FIG. 1B illustrates another view of the keyless electronic lock of FIG. 1A, according to one embodiment.

FIG. 1B illustrates another view of the keyless electronic lock 100 of FIG. 1A. A weep hole 108 allows water and/or debris to escape from the lock body 105, according to various embodiments.

Figure 2A:
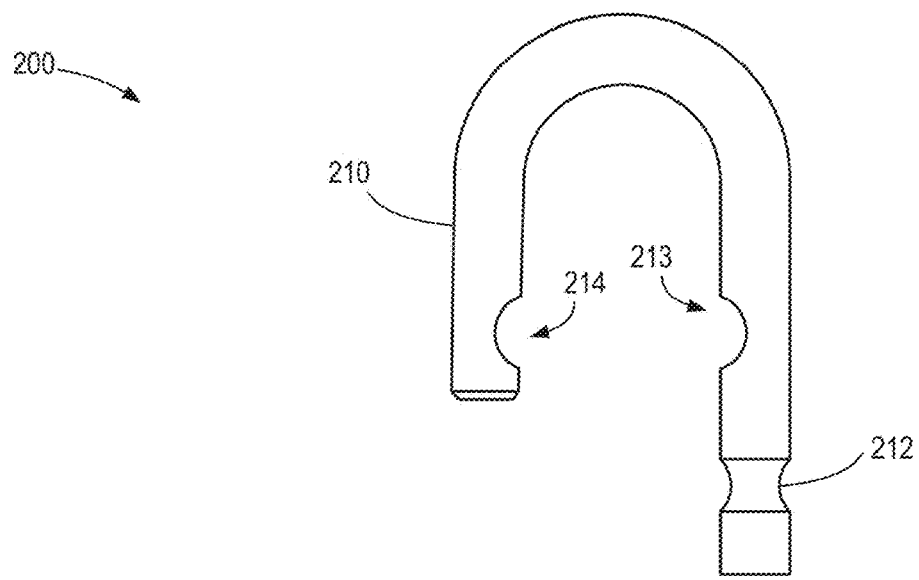
FIG. 2A illustrates an exploded view of several portions of a keyless electronic lock, including a lock body without a shackle shroud, according to one embodiment.
Figure 2A:
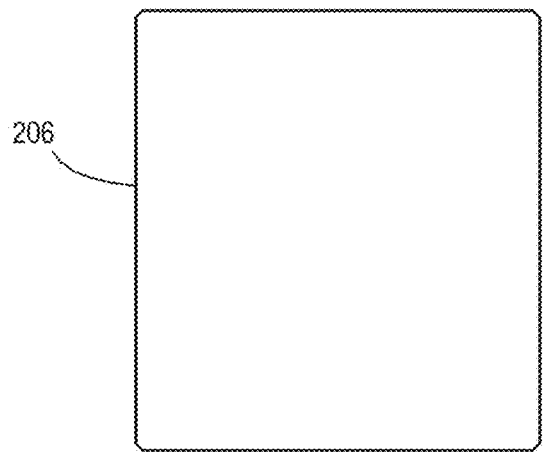
Figure 2A:
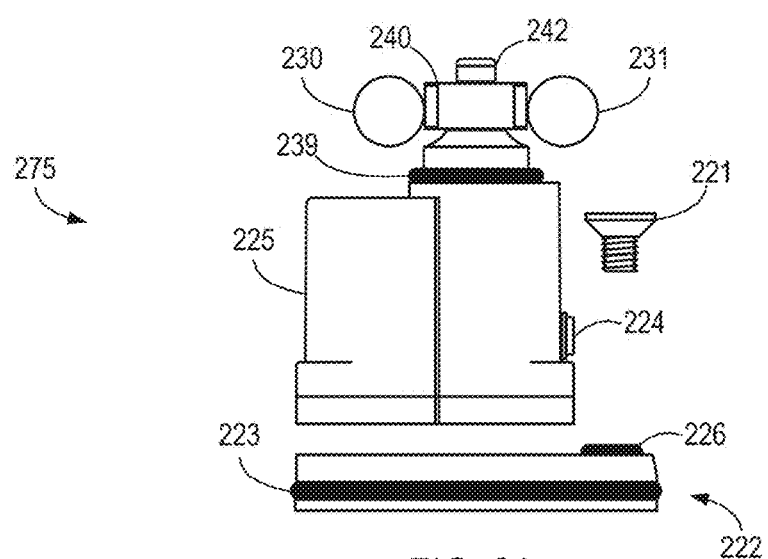

FIG. 2A illustrates an exploded view of several portions of a keyless electronic lock 200, including a lock body 206 without a shackle shroud. A shackle 210 is shown with a first lock notch 214 on the free end of the shackle 210, a second lock notch 213 on the secured end of the shackle 210, and a revolved notch 212 proximate the distal end of the secured end of the shackle 210. The exploded view also reveals a control cartridge 275 that is sealed (e.g., water resistant, waterproof, or even hermetically sealed) that includes the inner mechanical and electrical components of the keyless electronic lock 200. Gaskets 223 239 may, respectively, seal the baseplate 222 to the lock body 206 and the control cartridge 275 to the lock body to provide additional sealing. Since the control cartridge 275 itself can also be sealed, the inner mechanical and electrical components can be effectively doubled sealed. The electronics casing 225 of the control cartridge 275 encases a battery or other power supply, control circuitry, a motor, wireless interface modules, and/or other electronic and mechanical components.

A tapped hole 226 in the baseplate 222 receives an assembly screw 221 that selectively secures the baseplate 222 to the lock body 206. The assembly screw 221 may be inserted through the same aperture in the lock body 206 that receives the distal end of the shackle 210. The head of the assembly screw 221 may be seated against an inner portion of the lock body 206 and threaded into the tapped hole 226 to secure the baseplate 222 to the lock body 206. A rubber gasket 239 seals the top portion of the electronics casing 225 within the lock body 206. When assembled, the asymmetric cam 240 and ball bearings 230 and 231 are aligned with the lock notches 213 and 214 in the shackle 210. A shaft 242 connects the asymmetric cam 240 to a motor or other electrically actuated device within the electronics casing 225. In some embodiments, the shaft 242 may be connected to a mechanical lock assembly that receives a standard metal key.

Figure 2B:
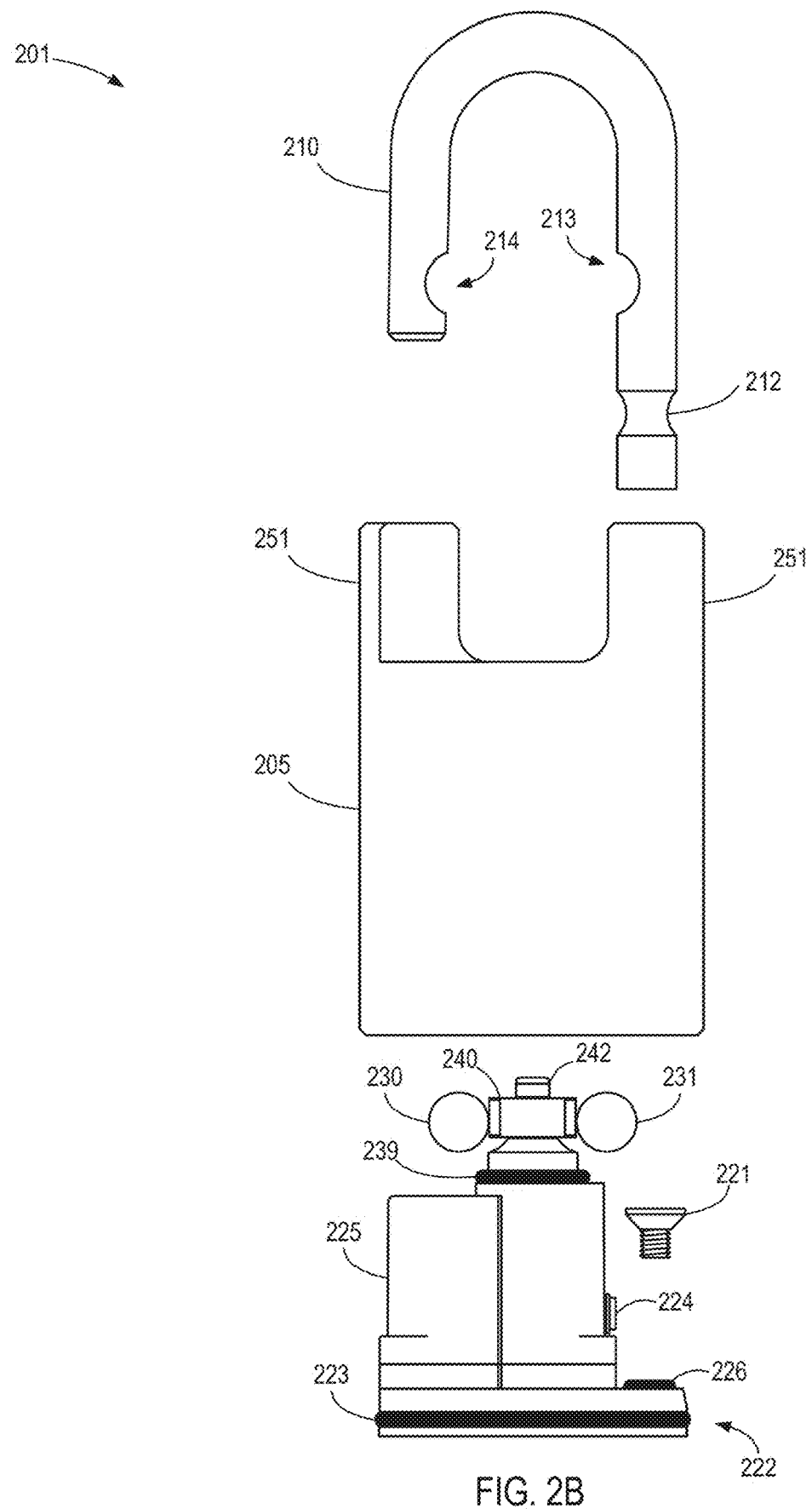
FIG. 2B illustrates an exploded view of several portions of a keyless electronic lock with a shrouded-shackle lock body, according to one embodiment.

FIG. 2B illustrates another exploded view of the assembly of a keyless electronic lock 201 with a lock body 205 that includes shackle shrouds 251 (i.e., a shrouded-shackle lock body). The shrouded-shackle lock body 205 has two shackle guard flanges 251 which protect the removable shackle 210 when it is in a locked state to prevent access thereto for cutting or leveraging. A shackle 210 is shown with a lock notch 214, another lock notch 213, and a revolved notch 212 along the distal end of the secured end of the shackle 210.

As described in conjunction with FIG. 2A, many of the same components may be used in the shrouded-shackle embodiment. For example, a gasket 223 may seal the baseplate 222 to the lock body 205. When assembled, the asymmetric cam 240 and ball bearings 230 and 231 are aligned with the lock notches 213 and 214 in the shackle 210.

Figure 2C:
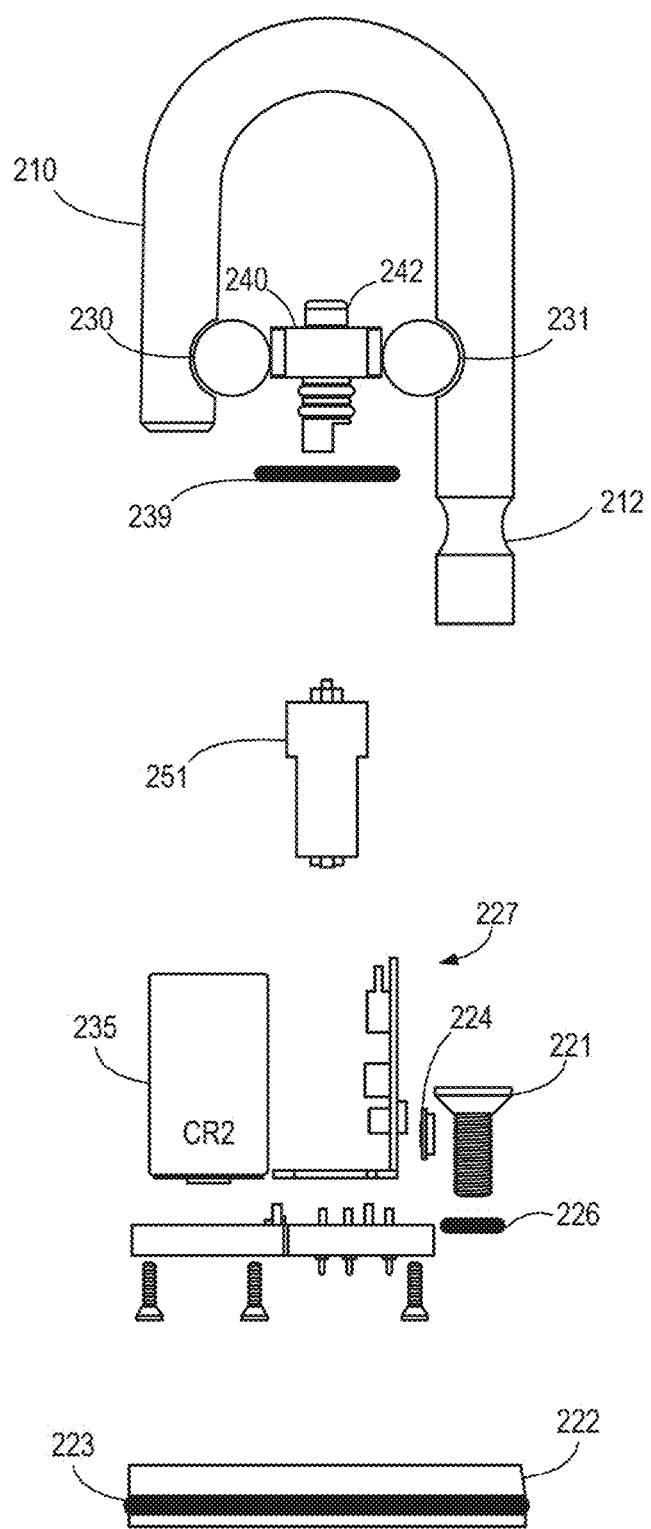
FIG. 2C illustrates various internal components of one embodiment of a keyless electronic lock, according to one embodiment.

FIG. 2C illustrates some internal components of various embodiments of a keyless electronic lock. An internal power supply 235 powers an internal microcontroller and/or other control circuitry, wireless modules, and the like. An internal control board includes control circuitry 227 to manage and control electronic interactions with the lock, including wireless interfaces, physical sensors, actuators, and/or other processes and components of the variously described keyless electronic locks.

A shackle sensor 224 may be positioned proximate the base of the removable shackle 210 to detect a magnetic element proximate the distal end of the shackle 210. The control circuitry 227 controls the rotation of the motor 251, which may be embodied as, for example, a stepper motor, servo motor, or another electronically controlled rotator device. The motor 251 controls the rotation of the asymmetric cam 240 via shaft 242.

Figure 3A:
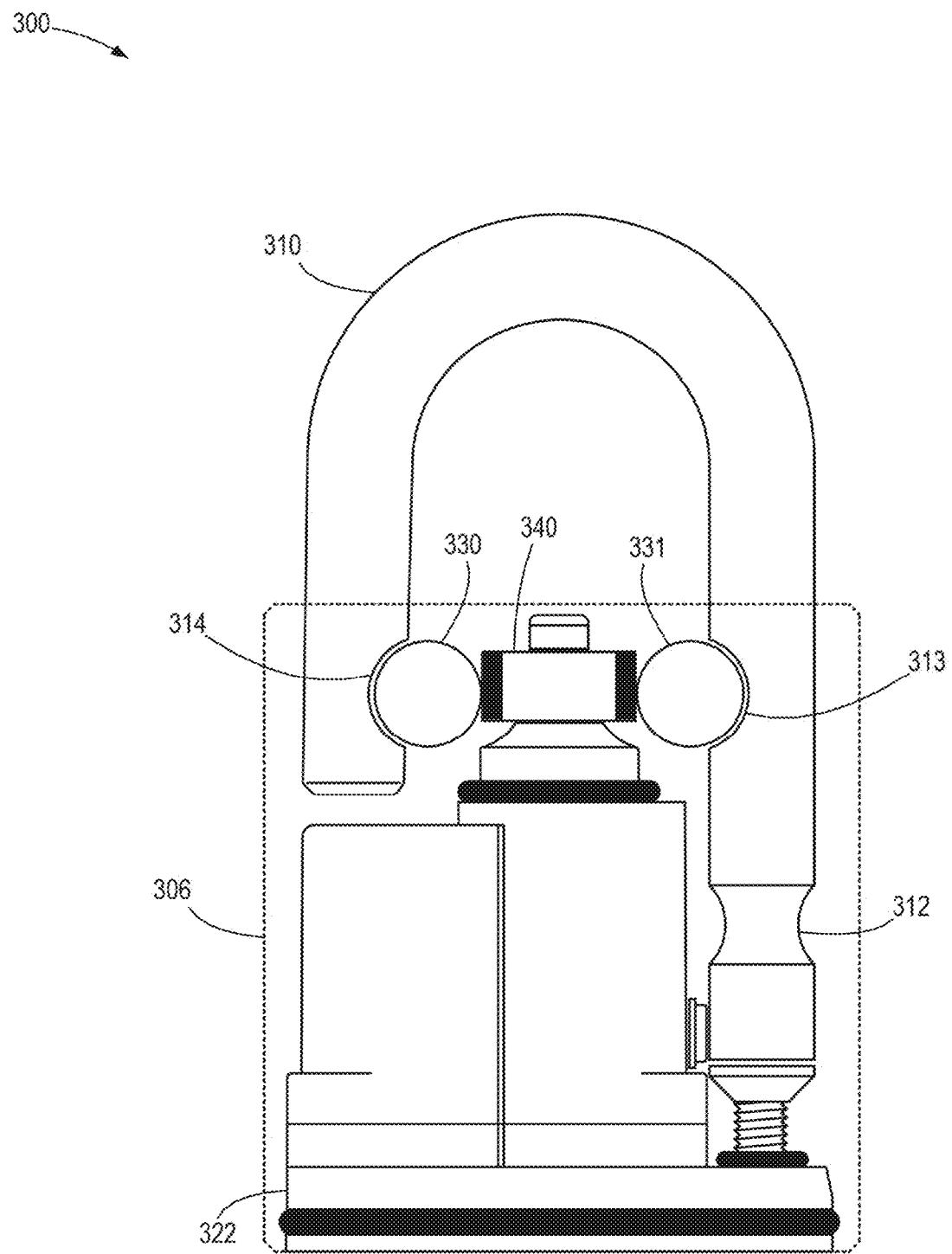
FIG. 3A illustrates a keyless electronic lock with an asymmetric cam in a locked state to prevent the shackle from being unlocked, according to one embodiment.

FIG. 3A illustrates a keyless electronic lock 300 that includes a lock body 306, a baseplate 322, and a shackle 310. As previously described, the shackle 310 includes a proximal end with a first lock notch 314 and a distal end with a second lock notch 313 and a revolved notch 312. The proximal end with the lock notch 314 may be referred to as a "free" end in that it is released and free when the electronic lock 300 is in an unlocked state. The distal end with the lock notch 313 and the revolved notch 312 may be referred to as the "secured" end in that it remains secure, but rotatable when the electronic lock 300 is in an unlocked state.

As illustrated, the asymmetric cam 340 in the locked state prevents the shackle 310 from being unlocked by pushing ball bearings 330 and 331 into lock notches 313 and 314 of the shackle 310. The ball bearings 330 and 331 prevent the shackle 310 from sliding upward out of the lock body 306.

Figure 3B:
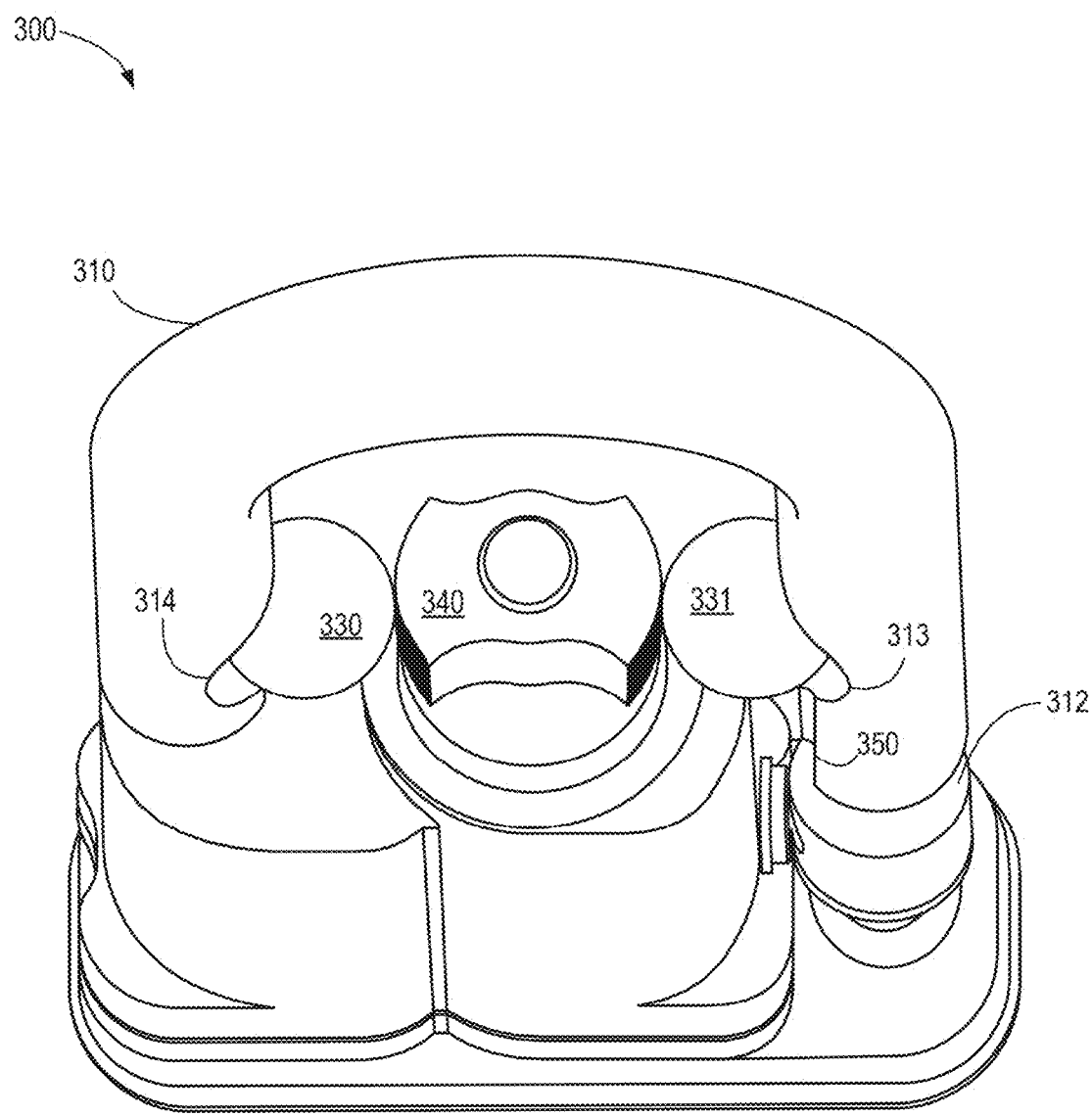
FIG. 3B illustrates a top three-quarter view of the keyless electronic lock with the lock body removed to show the asymmetric cam in the locked state, according to one embodiment.

FIG. 3B illustrates a top three-quarter view of the keyless electronic lock 300 with the lock body (306, in FIG. 3A) removed to show the asymmetric cam 340 in the locked state. Ball bearings 330 and 331 are secured into lock notch 313 and lock notch 314 to prevent the shackle 310 from sliding upward. The asymmetric cam 340 is rotated so that the ball bearings 330 and 331 are pushed out from the asymmetric cam 340 into the lock notches 313 and 314. A vertical groove 350 is shown between the lock notch 313 and the revolved notch 312. The revolved notch 312 is not engaged when the electronic lock 300 is in the locked state.

Figure 3C:
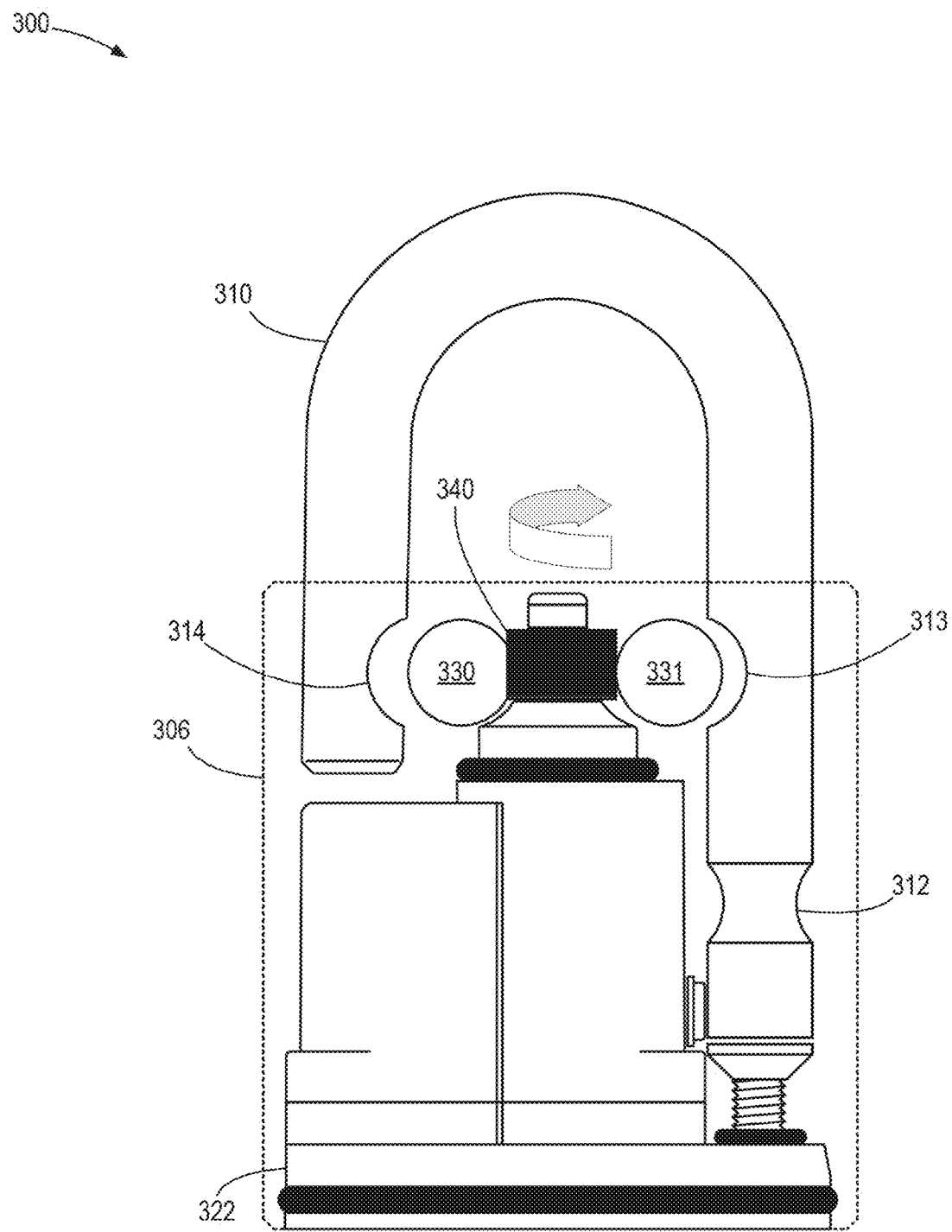
FIG. 3C illustrates the asymmetric cam rotated to an unlocked state in which the shackle can be unlocked, but not removed, according to one embodiment.

FIG. 3C illustrates the asymmetric cam 340 rotated to an unlocked state in which the shackle 310 can be unlocked, but not removed from the lock body 306. The ball bearings 330 and 331 are retracted into the concave recesses of the asymmetric cam 340. As illustrated, the lock notches 313 and 314 are no longer engaged with the ball bearings 330 and 331. The asymmetric cam 340 is rotated so the ball bearings 330 and 331 are recessed to the innermost point in from the asymmetric cam 340 center. At the base of the shackle 310 is the revolved notch 312 which is not being engaged at this point. The baseplate 322 is fully enclosed with the lock body 306 showing the keyless electronic lock fully enclosed, according to one embodiment.

Figure 3D:
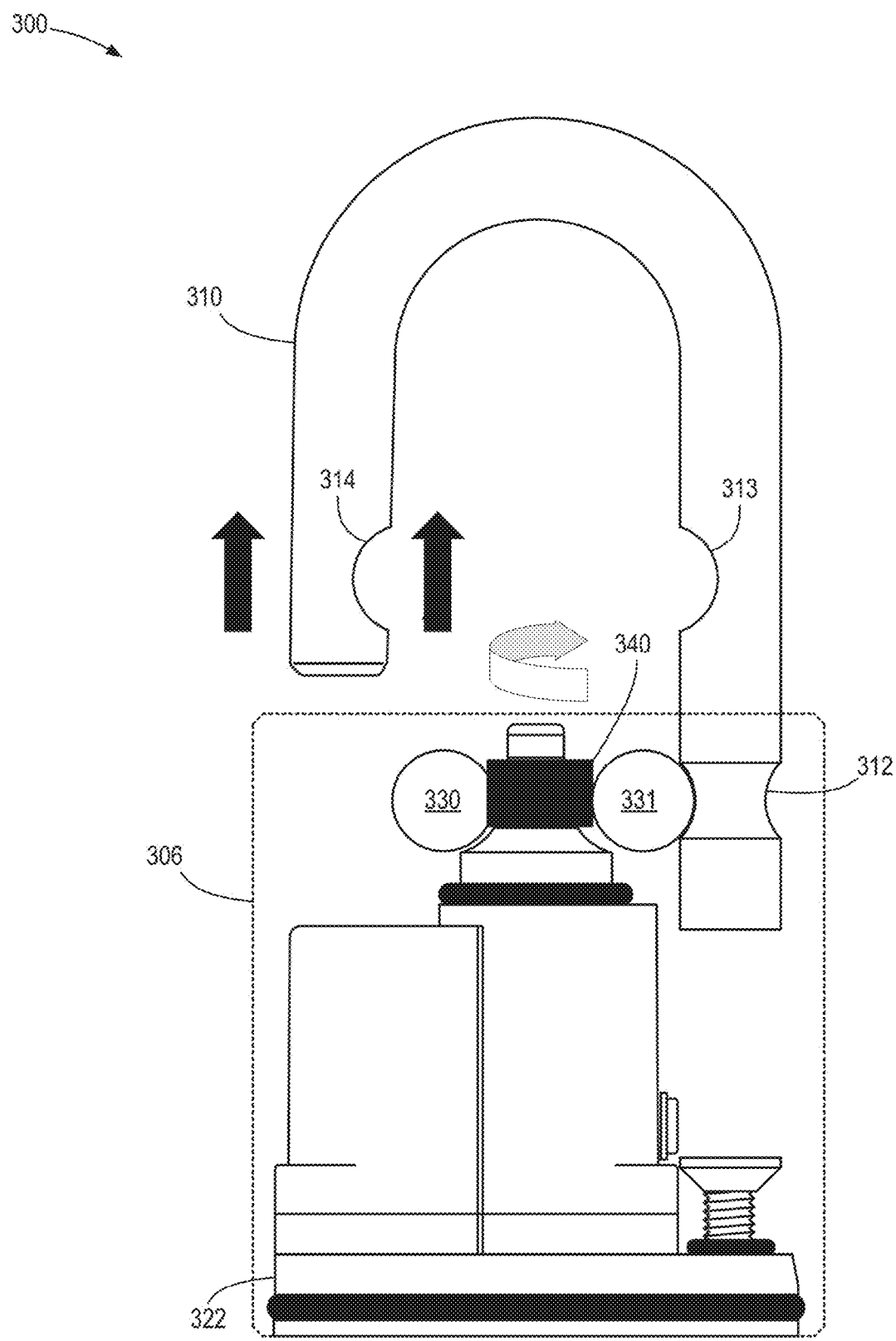
FIG. 3D illustrates the shackle in an unlocked state, but prevented from being removed by the asymmetric cam, according to one embodiment.

FIG. 3D illustrates the shackle 310 in an unlocked state with the proximal end with lock notch 314 free. In the unlocked state, the shackle 310 is still retained within the lock body 306 and prevented from being removed. Specifically, the ball bearing 331 has traversed the groove (350, FIG. 3C) between the lock notch 313 and the revolved notch 312. The ball bearing 331 interacts with the revolved notch 312 to prevent the shackle 310 from being removed. The revolved notch 312 prevents the shackle from being removed but allows the shackle 310 to swivel with the lock body 306 freely.

Figure 3E:
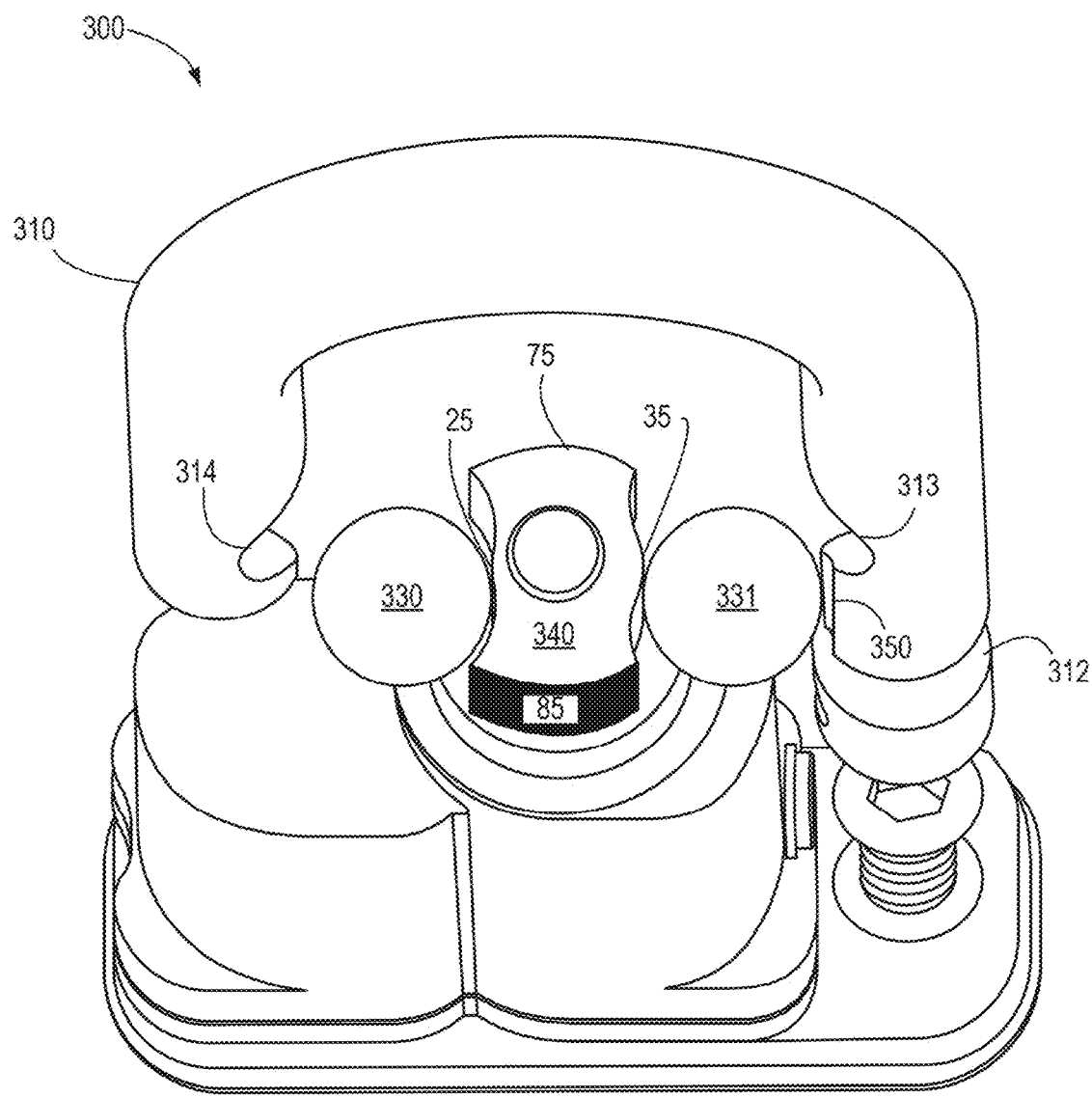
FIG. 3E illustrates a top three-quarter view of the keyless electronic lock with the lock body removed to show the asymmetric cam in the unlocked state, according to one embodiment.

FIG. 3E illustrates a top three-quarter view of the keyless electronic lock 300 with the lock body (306, FIG. 3A) removed to show the asymmetric cam 340 in the unlocked state. Lock notches 313 and 314 are no longer engaged. However the revolved notch 312 is fully engaged and prevents the shackle 310 from being fully removed while still allowing the shackle 310 to swivel. The vertical groove 350 allows the shackle 310 to slide to the open position with the proximal end thereof free from the lock body (not shown).

In the unlocked state, the larger convex projection 35 faces the distal or secured end of the shackle 310 and allows the ball bearing 331 to be retracted into the cam recess sufficiently to disengage the lock notch 313. However, the larger convex projection 35 prevents the ball bearing 331 from being retracted sufficiently to disengage the revolved notch 312. That is, the larger convex projection 35 forces the ball bearing 331 into the revolved notch 312. The smaller convex projection 25 faces the proximal or free end of the shackle and allows the ball bearing 330 to be retracted into the cam recess sufficiently to disengage the lock notch 314.

The geometry of the asymmetric cam 340 may facilitate a smooth transition between locked, unlocked, and removal states. Moreover, the convex projects 25 and 35 allow for some rotational error. That is, while the drawings illustrate perfect 90-degree rotations between the various states, the unique geometry of having concave recesses with convex protrusions 25 and 35 therein allows for some degree of error in the rotation without affecting the functionality thereof. Similarly, the convex-rounded faces 75 and 85 allow for some degree of error in the rotation to the locked state. The geometries allow for some degree of error in the rotation which allows for the use of less-precise motors and/or motor controls. Less precise motors and/or motor controls can cost less, which is one benefit, but less precise motors may also be physically stronger to withstand repeated use and resist breaking.

Figure 4A:
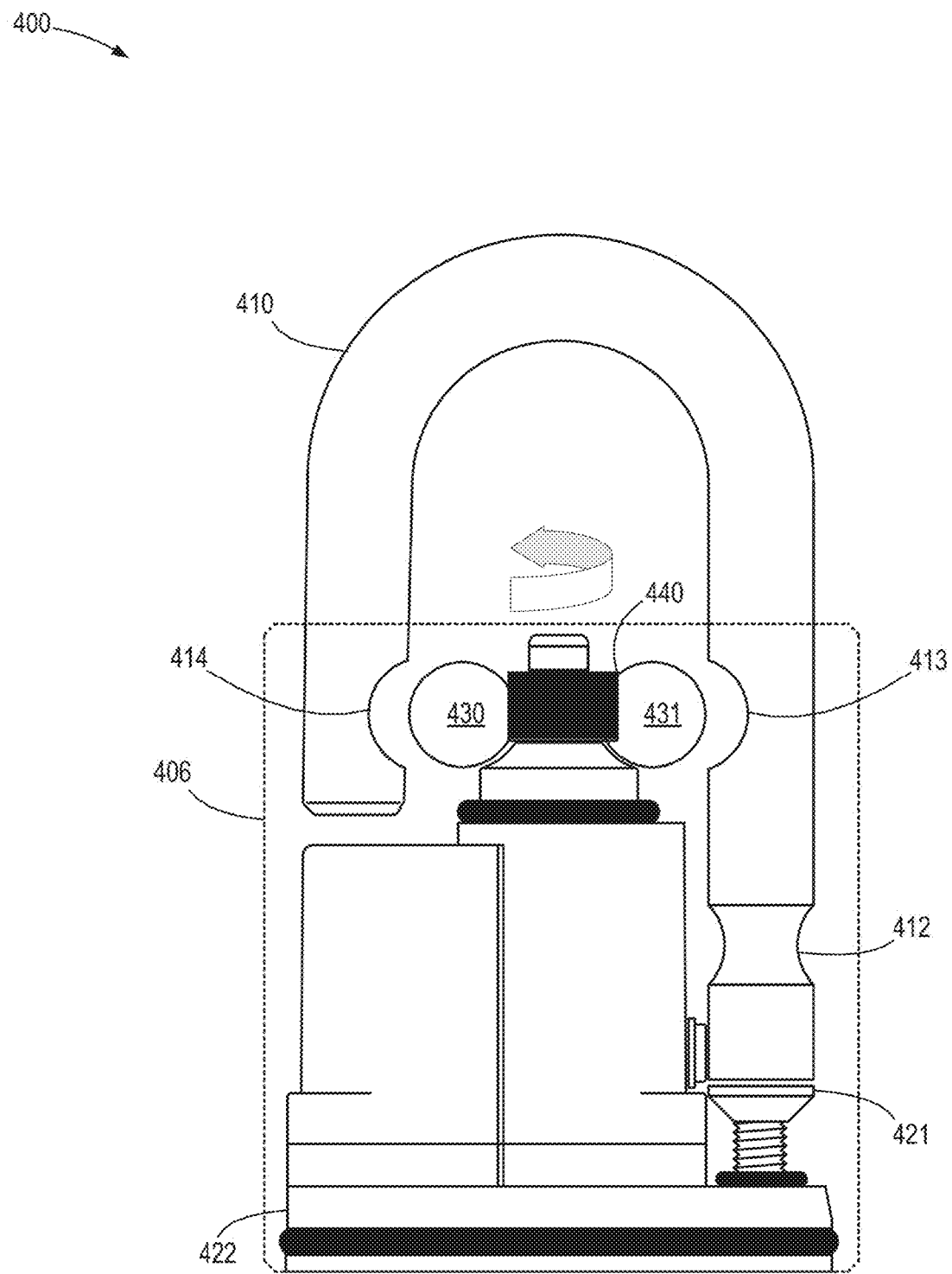
FIG. 4A illustrates a keyless electronic lock with an asymmetric cam rotated to a removal state to allow the shackle to be removed from the lock body, according to one embodiment.

FIG. 4A illustrates a keyless electronic lock 400 with an asymmetric cam 440 rotated to a removal state to allow the shackle 410 to be removed from the lock body 406. As previously described, the asymmetric cam 440 has a unique geometry that allows the ball bearings 430 and 431 to be retracted into the cam recesses. In the removal state, lock notch 413 and lock notch 414 are not engaged. Rotated to the removal state, the asymmetric cam 440 allows the ball bearing 431 to retract farther into the asymmetric cam 440. The ball bearing 431 retracts sufficiently to not engage the revolved notch 412 as the shackle 410 is removed from the lock body 406.

As in other embodiments, the electronic lock includes a baseplate 422 to secure the various electronic and mechanical components within the lock body 406. A screw 421 may secure the baseplate 422 to the lock body 406. The screw 421 may only be accessible through the same aperture that receives the distal end of the shackle 410 with the lock notch 413 and the revolved notch 412.

Figure 4B:
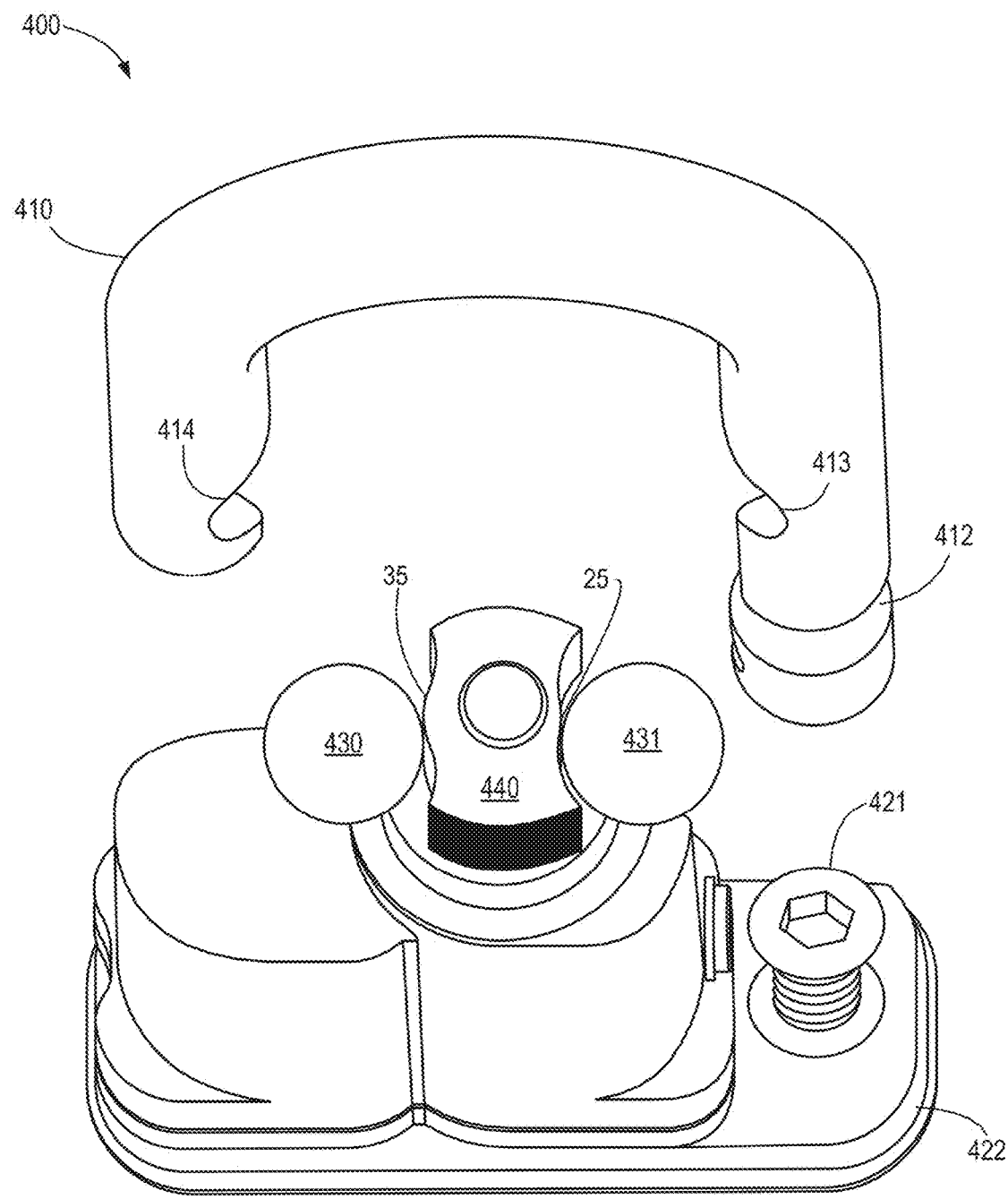
FIG. 4B illustrates a top three-quarter view of the keyless electronic lock with the lock body removed to show the asymmetric cam in the removal state, according to one embodiment.

FIG. 4B illustrates a top three-quarter view of the keyless electronic lock 400 with the lock body (406, FIG. 4A) removed to show the asymmetric cam 440 in the removal state. In the removal state, the asymmetric cam 440 allows the ball bearings 430 and 431 to fully retract into the cam recesses. The larger convex projection 35 facing the proximal or free end of the shackle 410 allows the ball bearing 430 to be retracted into the cam recess sufficiently to disengage the lock notch 414. The smaller convex projection 25 facing the distal end of the shackle allows the ball bearing 430 to be retracted into the cam recess sufficiently to disengage both the lock notch 413 and the revolved notch 412.

Figure 4C:
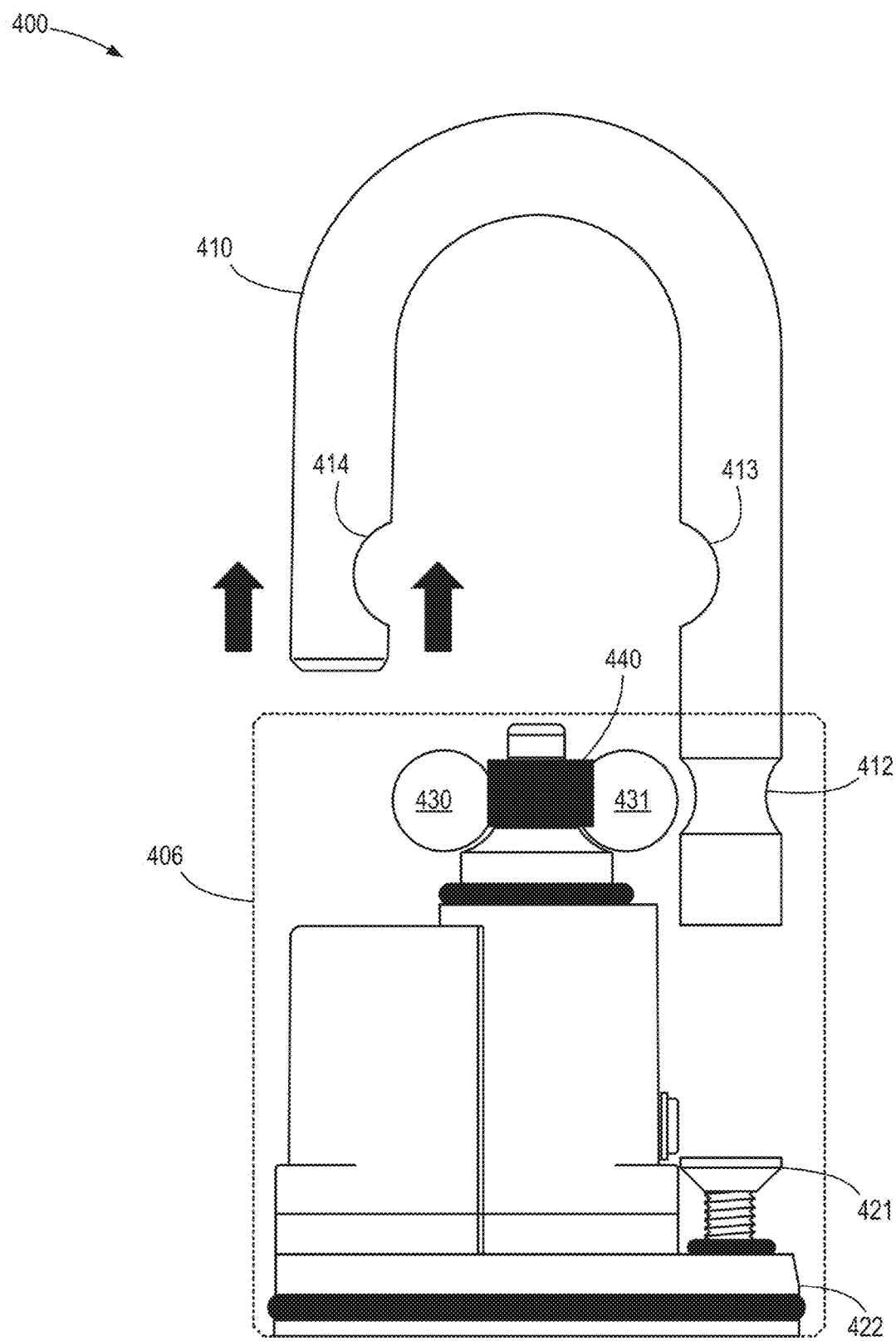
FIG. 4C illustrates the shackle being removed with the asymmetric cam rotated to the removal state, according to one embodiment.

FIG. 4C illustrates the shackle 410 removed with the asymmetric cam 440 rotated to the removal state. As illustrated, the asymmetric cam 440 allows the ball bearing 431 to retract sufficiently to not engage the revolved notch 412 as the shackle 410 is removed.

Figure 4D:
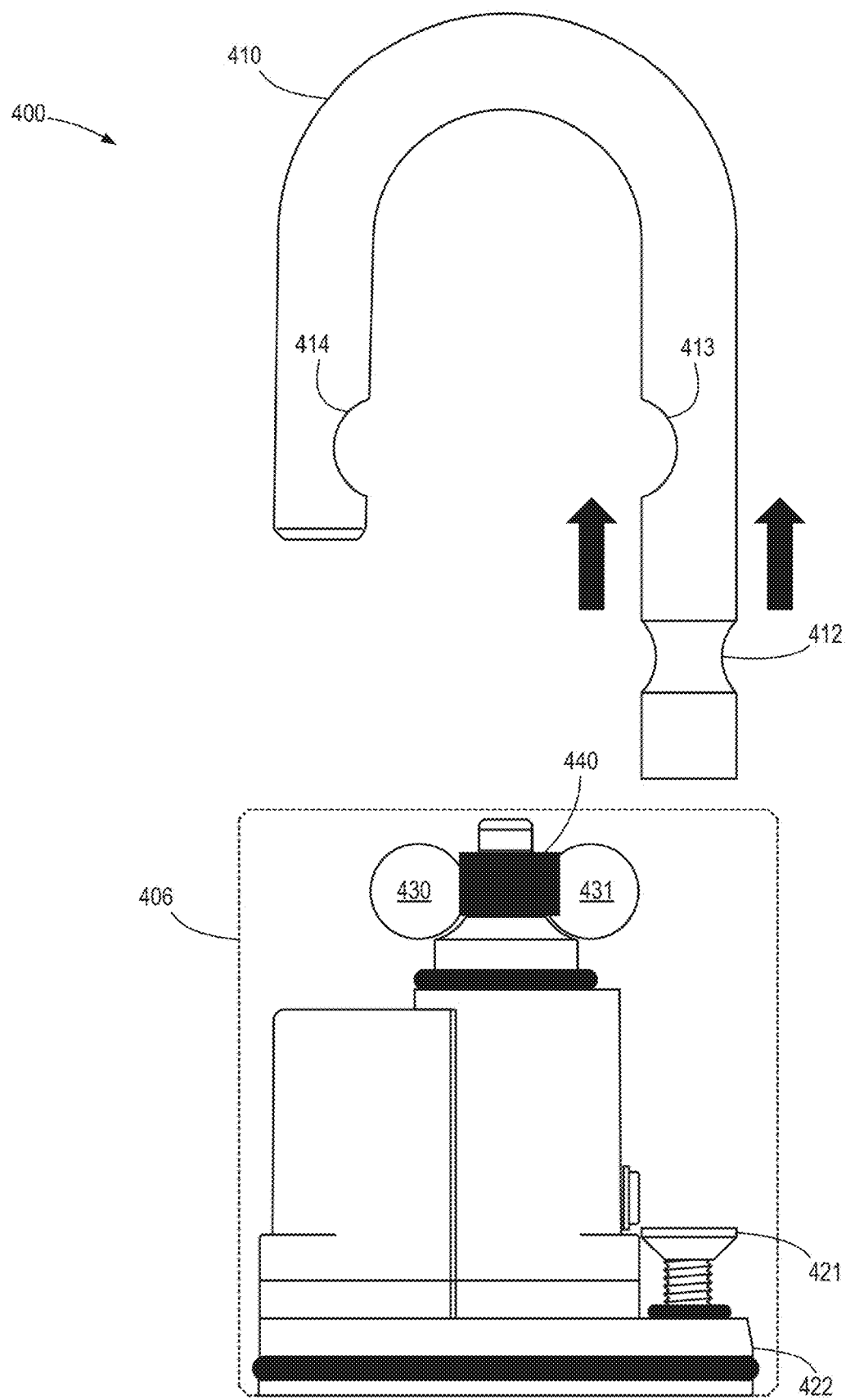
FIG. 4D illustrates the shackle removed from the lock body, according to one embodiment.

FIG. 4D illustrates the shackle 410 removed from the lock body 406. As illustrated, the asymmetric cam 440 allows the ball bearings 430 and 431 to be fully retracted into the recesses of the asymmetric cam 440. With the shackle 410 fully removed from the lock body 406, the assembly screw 421 is accessible. As illustrated, the assembly screw 421 is engaged with the baseplate 422 and retains the baseplate 422 secured to the lock body 406.

Figure 4E:
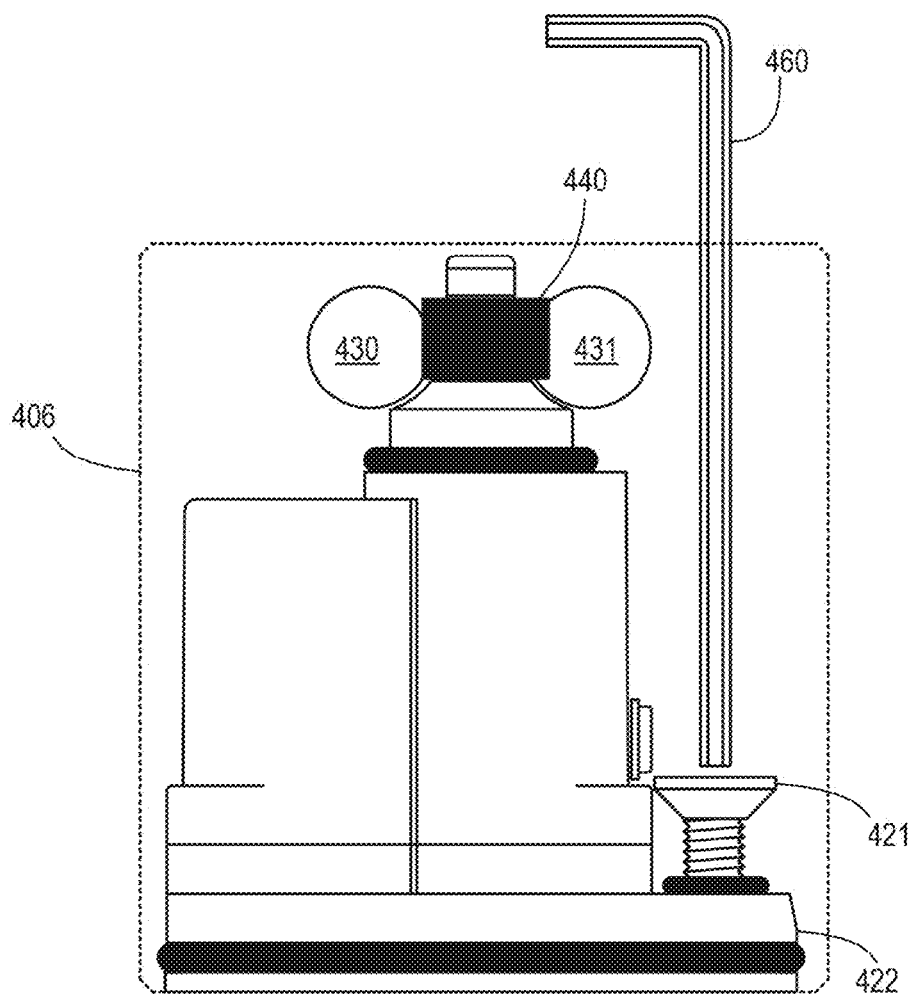
FIG. 4E illustrates an Allen wrench used to remove a screw securing the bottom plate within the lock body, according to one embodiment.

FIG. 4E illustrates an Allen wrench 460 being used to remove the screw 421 from the baseplate 422. Removal of the screw 421 allows the baseplate 422 to be disengaged from the lock body 406.

Figure 4F:
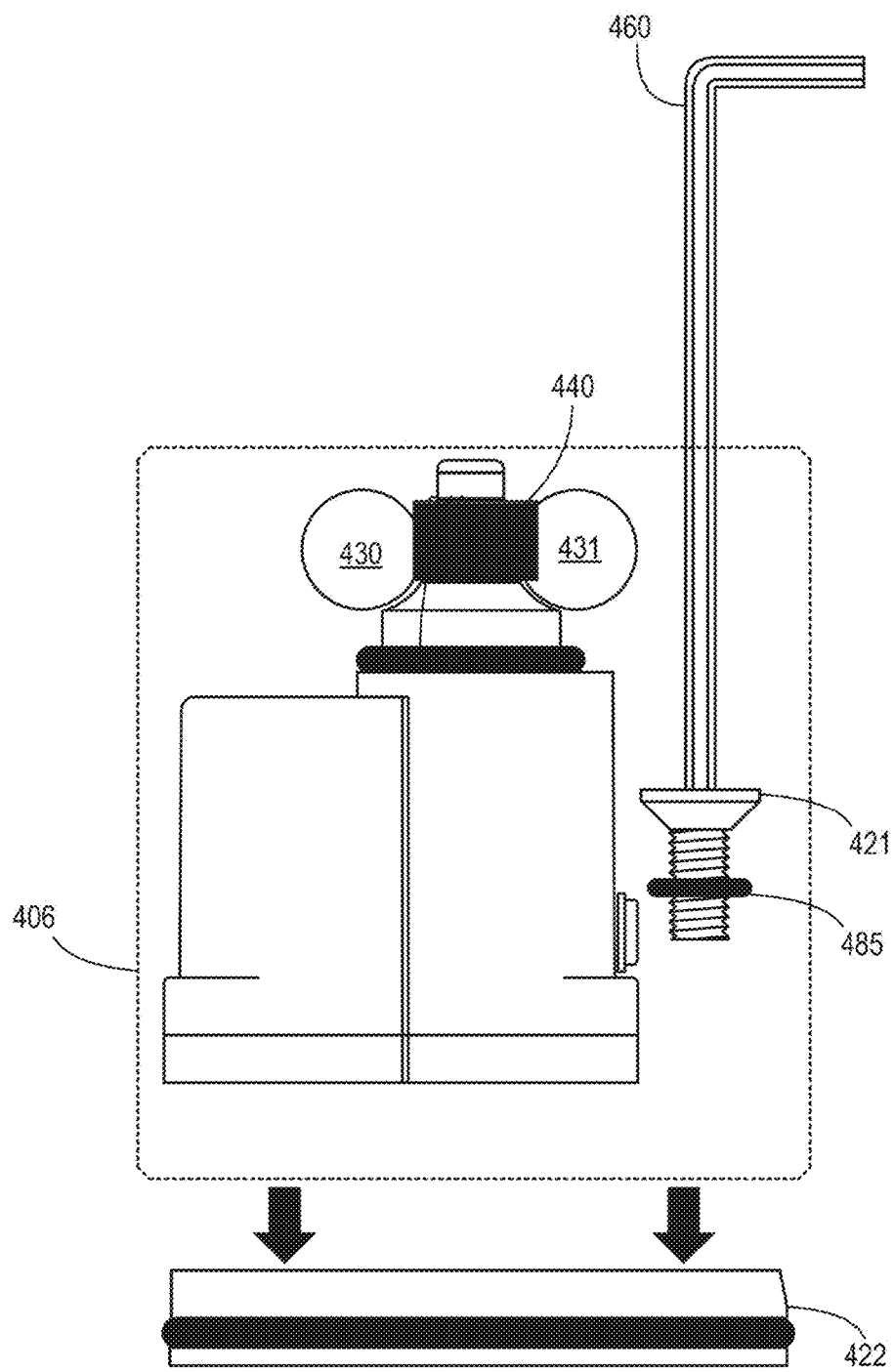
FIG. 4F illustrates the bottom plate being removed from the lock body, according to one embodiment.

FIG. 4F illustrates the baseplate 422 removed from the lock body 406. A gasket 485 may provide additional waterproofing.

Figure 4G:
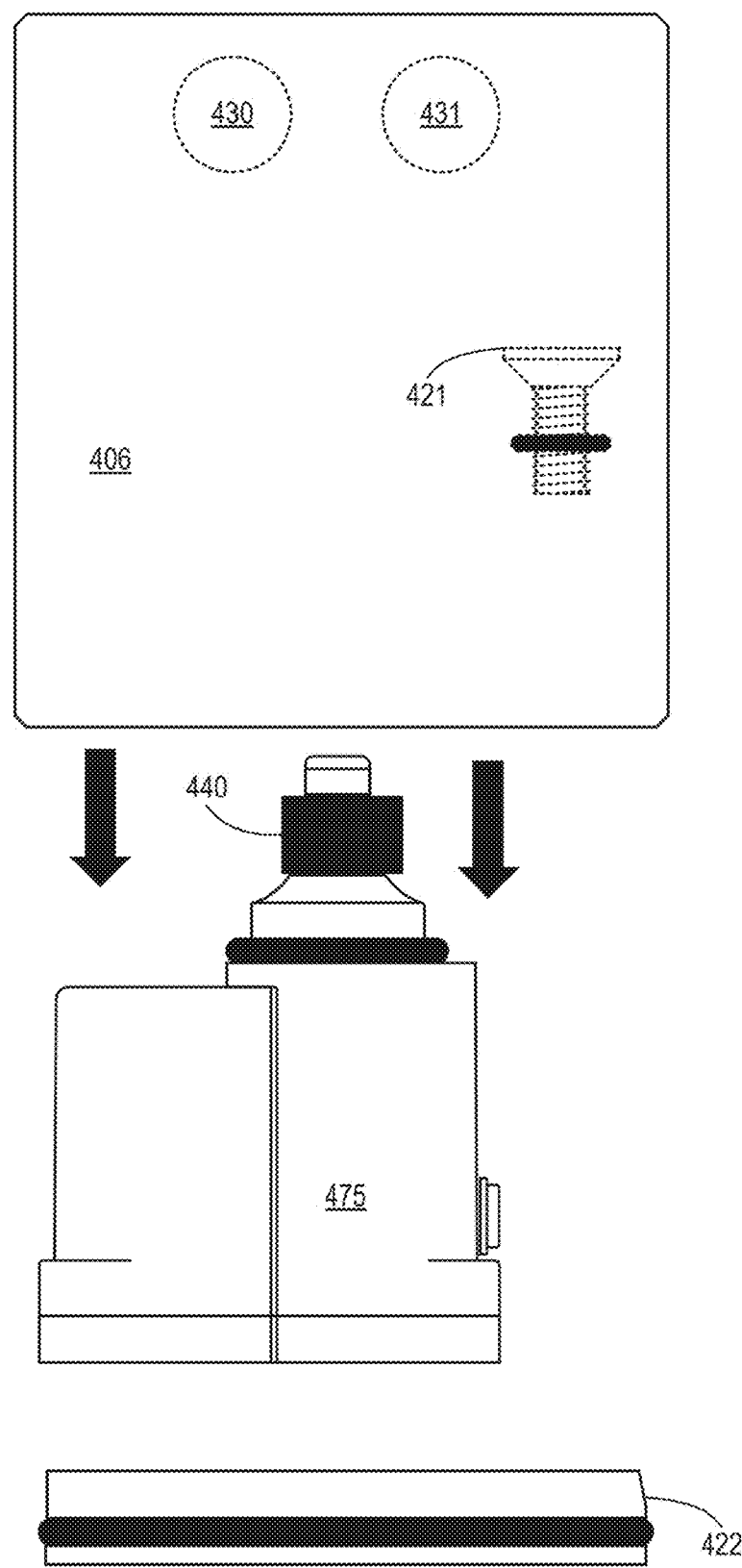
FIG. 4G illustrates the battery, control circuitry, and asymmetric cam removed from the lock body through the bottom plate opening, according to one embodiment.

FIG. 4G illustrates the control cartridge 475, including the asymmetric cam 440 removed from the lock body 406 through the baseplate 422 opening. The modular nature of the control cartridge 475, shackle (not shown), lock body 406, and baseplate 422 allows for cost-effective repair and refurbishment. For example, if the electronics within the sealed control cartridge 475 fail, the entire control cartridge 475 and/or just the sealed portion excluding the asymmetric cam 440 can be replaced as a modular unit without the need to replace the baseplate 422, the lock body 406, ball bearings 430 and 431, and/or the shackle (not shown).

Figure 5:
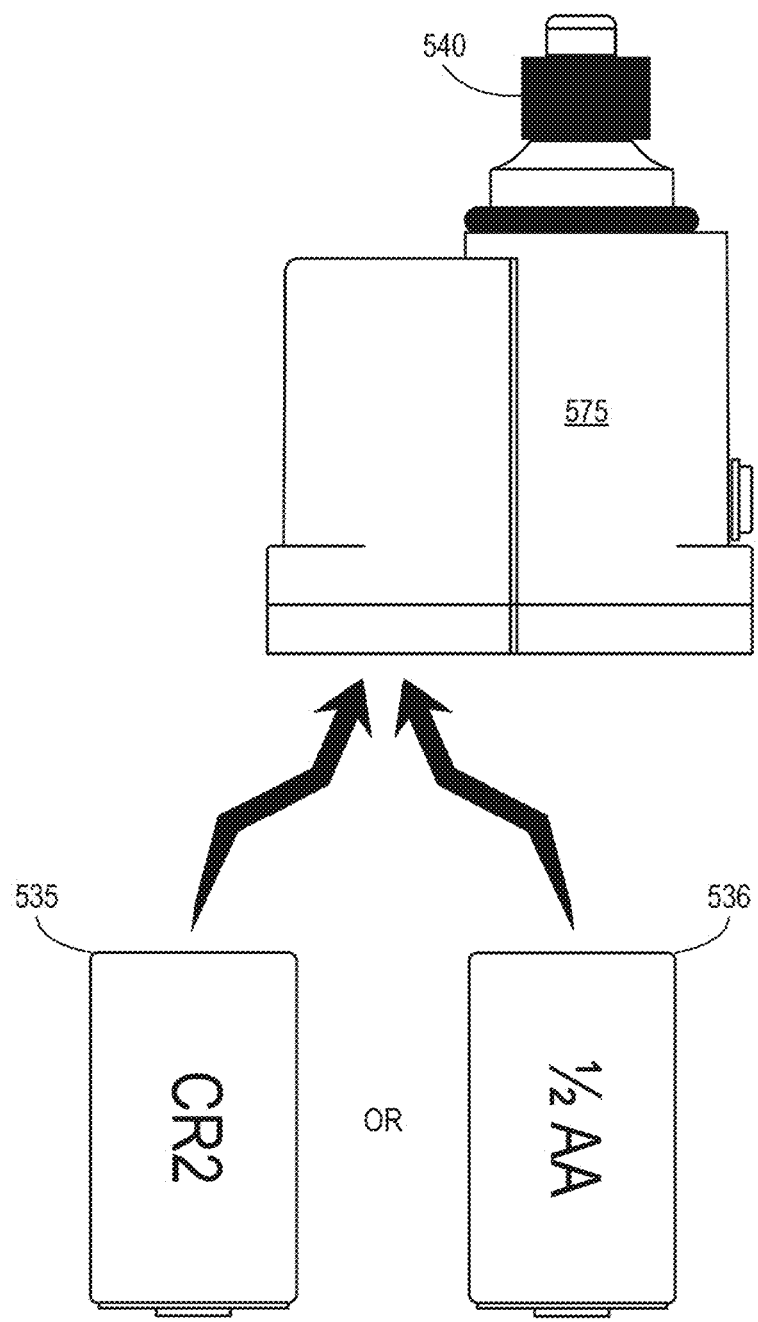
FIG. 5 illustrates optional CR2 and half-AA batteries being inserted into the control module, according to one embodiment.

FIG. 5 illustrates two different types of batteries that may be used in combination with various embodiments described herein. As illustrated, the control circuitry and motor within the electronics housing 575 that drive the asymmetric cam 540 may be powered by a CR2 battery 535 or a half-AA battery 536. The battery may be replaced following the removal of the shackle as shown in FIG. 4F. If the battery is fully discharged, the electronic lock may not function. Since the battery cannot be removed and replaced or recharged without removal of the shackle, the lock may be jumpstarted using the external contact terminals (104, FIG. 1A).

Figure 6A:
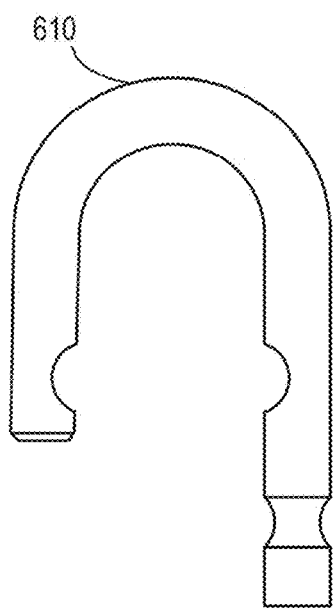
FIG. 6A illustrates a standard shackle with a uniform diameter, according to one embodiment.

FIG. 6A illustrates a standard shackle 610 with a uniform diameter, according to one embodiment.

Figure 6B:
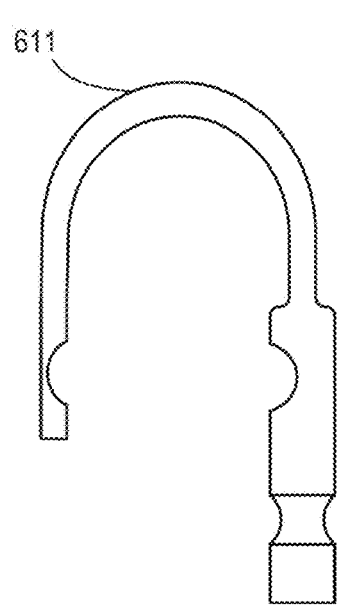
FIG. 6B illustrates a base-and-taper shackle that can be interchangeably used with various keyless electronic locks described herein, according to various embodiments.

FIG. 6B illustrates a base-and-taper shackle 611 that can be interchangeably used with various keyless electronic locks described herein, according to various embodiments. As illustrated, the distal end of the shackle 611 may be the same diameter as the standard shackle 610, while the proximal end of the shackle 611 may be narrower for use in locking applications that benefit from the use of narrower shackles.

Figure 6C:
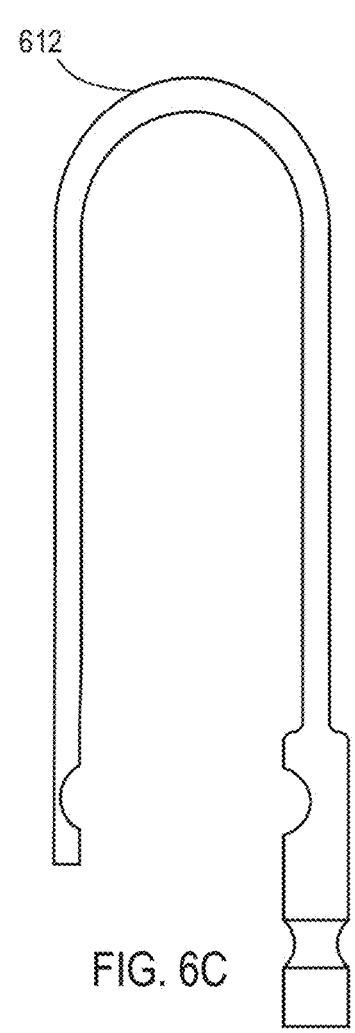
FIG. 6C illustrates an extra-long base-and-taper shackle that can be interchangeably used with various keyless electronic locks described herein, according to various embodiments.

FIG. 6C illustrates an extra-long base-and-taper shackle 612 that can be interchangeably used with various keyless electronic locks described herein, according to various embodiments.

Figure 6D:
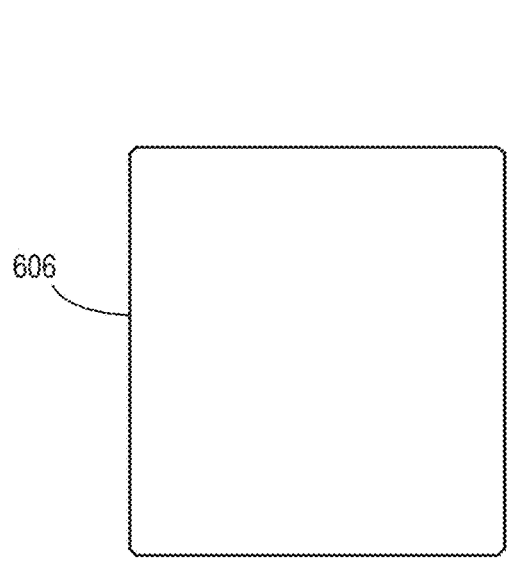
FIG. 6D illustrates a rectangular lock body without a shackle shroud, according to one embodiment.

FIG. 6D illustrates a rectangular lock body 606 without a shackle shroud, according to one embodiment.

Figure 6E:
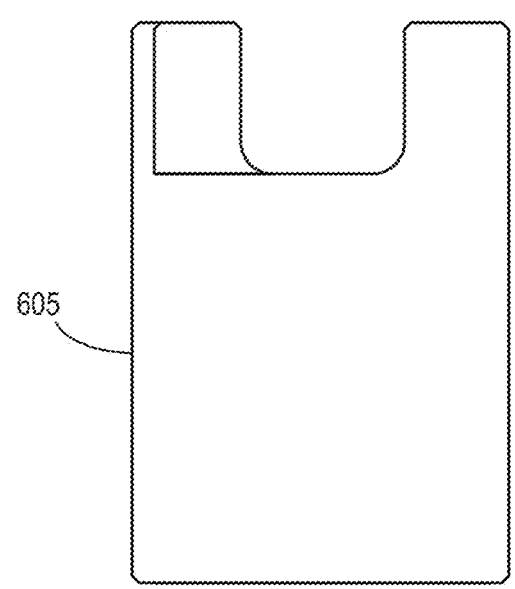
FIG. 6E illustrates a rectangular lock body with a shackle shroud, according to one embodiment.

FIG. 6E illustrates a rectangular shrouded lock body 605 with a shackle shroud, according to one embodiment.

FIG. 6F illustrates a hitch ball lock assembly with a portion 681 of a shackle with a ball 682 and side lock portion 683 that can be used interchangeably with the other shackles compatible with the various lock bodies described herein.

FIG. 6G illustrates a hitch receiver lock assembly 685 that can be used interchangeably with the other shackles compatible with the various lock bodies described herein.

FIG. 6H illustrates an oversized shackle 686 with tapered ends for compatibility with the various lock bodies described herein.

Figure 6I:
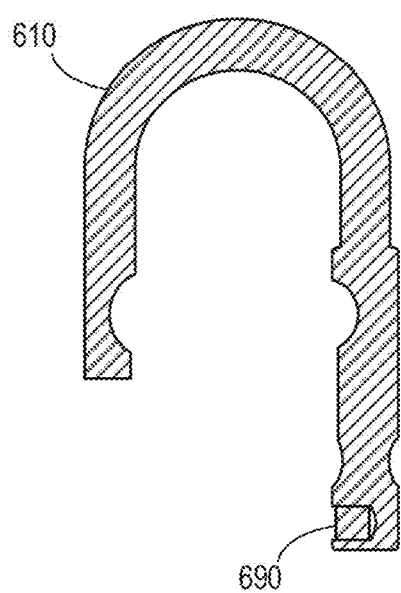
FIG. 6I illustrates a side view of the shackle of FIG. 6A with an encoded insert, according to one embodiment.

FIG. 6I illustrates a cross sectional side view of the shackle 610 of FIG. 6A with an encoded insert 690, according to one embodiment. The encoded insert 690 may simply be a magnet detectable by a shackle sensor (224, FIG. 2A-2C). The shackle sensor may detect when the shackle 610 is in a locked state by detecting the magnet (encoded insert 690) within the distal end of the shackle 610. As illustrated, the shackle may have a hole or cavity formed therein to accommodate the encoded insert 690 and allow for magnetic communication therefrom (or electromagnetic communication in some other embodiments).

In alternative embodiments, the shackle sensor may be able to differentiate between different magnet strengths, numbers of magnets, or magnetic orientation. In such embodiments, each different shackle type (FIGS. 6A-H) may have different magnetic characteristics detectable by the shackle sensor. Moreover, the shackle sensor may communicate with internal circuitry to provide shackle information to a mobile device or other external software application. In still other embodiments, the shackle sensor may be embodied as an RFID, NFC, or other short-range sensor to detect a suitably encoded insert 690.

Figure 6J:
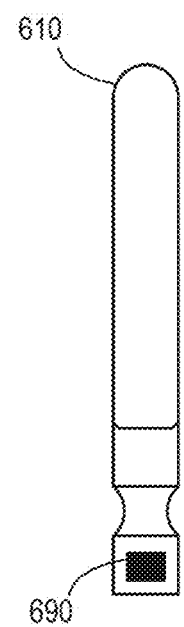
FIG. 6J illustrates a front view of the shackle of FIG. 6I with the encoded insert, according to one embodiment.

FIG. 6J illustrates a front view of the shackle of FIG. 6I with the encoded insert 690, according to one embodiment. In some embodiments, the encoded insert 690 may be visible within a cavity of the shackle material. In other embodiments, the encoded insert may be embedded within the shackle material, but not visible. In still other embodiments, the encoded insert 690 may be embodied as an external addition to the shackle 610. For example, a portion of the distal end of the shackle may include a notch within which a shackle insert may be adhered.

Figure 6K:
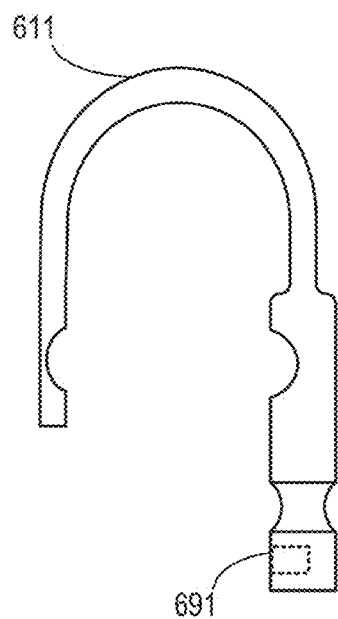
FIG. 6K illustrate a side view of the shackle of FIG. 6B with an encoded insert, according to one embodiment.

FIG. 6K illustrate a side view of the shackle of FIG. 6B with an encoded insert 691, according to one embodiment. As previously described, the encoded insert 691 may be a magnet or magnetic material to allow the shackle sensor (224, FIG. 2A-2C) to confirm that the shackle is in a locked position. In such embodiments, the encoded insert 691 may be identical or functionally identical to the encoded insert 690 in FIG. 6I. Any of the shackles described in conjunction with FIGS. 6A-6H may include a similar encoded insert. In other embodiments, the encoded insert 691 is different from the encoded insert 690 in FIG. 6I, and the shackle sensor is able to distinguish between them. Distinctions between the encoded inserts 690 and 691 may be magnetic strength, orientation, number of magnets, magnet position, etc.

In embodiments in which the shackle sensor includes a magnet, the encoded insert may be a magnetically detectable material instead of an actual magnet. As previously described, the shackle sensor may be a more complex sensor capable of sending and/or receiving encoded identification information of the shackle and the shackles may include electrically or magnetically encoded inserts to covey identifying information to the shackle sensor.

Figure 6L:
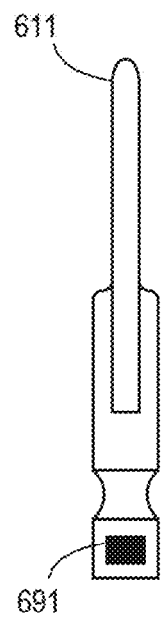
FIG. 6L a front view of the shackle of FIG. 6K with the encoded insert, according to one embodiment.

FIG. 6L a front view of the shackle of FIG. 6K with the encoded insert, according to one embodiment. As described and illustrated more clearly in FIG. 7A, the lock body of an electronic lock may include a thru-bore to allow for magnetic communication between the shackle sensor and the encoded inserts of the interchangeable shackles.

Figure 7A:
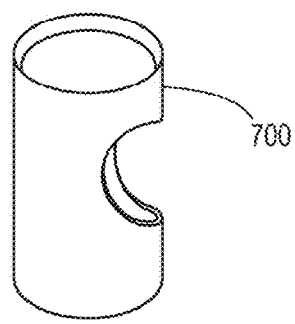
FIG. 7A illustrates a spacer for use with base-and-taper shackles to restrict movement within the aperture in the lock body, according to one embodiment.

FIG. 7A illustrates a spacer 700 for use with base-and-taper shackles to restrict movement within the aperture in the lock body that receives the tapered proximal end of the shackle (narrow-diameter end of the shackle), according to various embodiments. The spacer 700 may be plastic or metal. In some embodiments, non-sparking materials may be utilized for the spacer 700 and/or other components of the lock to ensure safe use in hazardous locations.

Figure 7B:
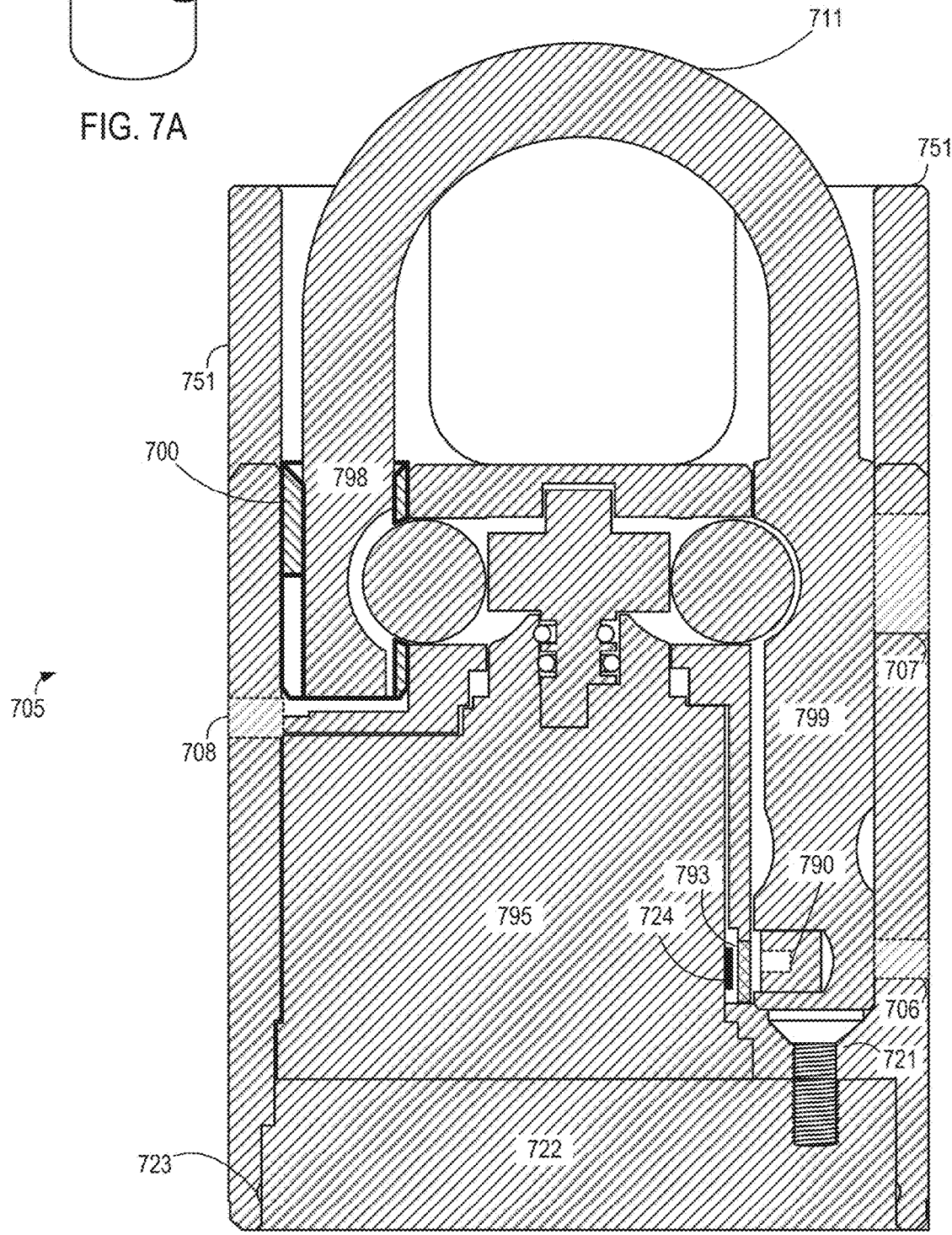
FIG. 7B illustrates the spacer being used with a base-and-taper shackle within a keyless electronic lock, according to one embodiment.

FIG. 7B illustrates the spacer 700 being used with a base-and-taper shackle 711 within a keyless electronic lock. The section view shows the spacer 700 inserted into the shallow shackle aperture of the lock body 705, the tapered end 798 of the base-and-tapered shackle 711 inserted into the spacer 700 which, in turn, is inserted into the shallow shackle aperture. The base-and-taper shackle 711 is therefore fully compatible and interchangeable with the other shackles described herein, and the functionality remains substantially similar. In the illustrated embodiment, the lock body 705 includes shackle shrouds 751. The shackle shrouds 751 may be separate components added to the main lock body 705, formed as a single piece with the lock body 705, and/or omitted.

The simplified cross-sectional view of FIG. 7B illustrates a weep hole 708 in the lock body 705 to allow for the release of water or other debris collected within the shallow shackle aperture. A corresponding weep hole 706 in the lock body 705 may be positioned near the distal, thicker end 799 of the shackle 711. An access hole 707 may allow for access to the ball bearings and/or asymmetrical cam when the shackle 711 is removed. In some embodiments, a plug may be inserted into access hold 707. It is appreciated that the relative dimensions of the lock body 705, shackle, baseplate 722, etc. may be varied without departing from the scope the present disclosure.

As illustrated, a screw 721 can be seated against a tapered portion of the lock body 705 to secure the baseplate 722 to the lock body 705. The screw 721 is accessible only after the shackle 711 is removed. A groove 732 in the lock body 705 may allow for a gasket to seal the baseplate 722 to the lock body 705. A magnetic element 790 (e.g., a magnet or magnetic material) located within the shackle may be detectable via the shackle sensor 724. A shackle detector 724 may detect the magnetic element 790 through an aperture in the lock body 705 or a magnetically transparent window 793 in the lock body 705. magnetically transparent window may, for example, include a plastic or rubber insert to allow for magnetic communication between the magnetic element 790 and the shackle detector 724 while preventing liquid or other debris from entering the cavity within the lock body 705 that houses the control cartridge 795.

Figure 8:
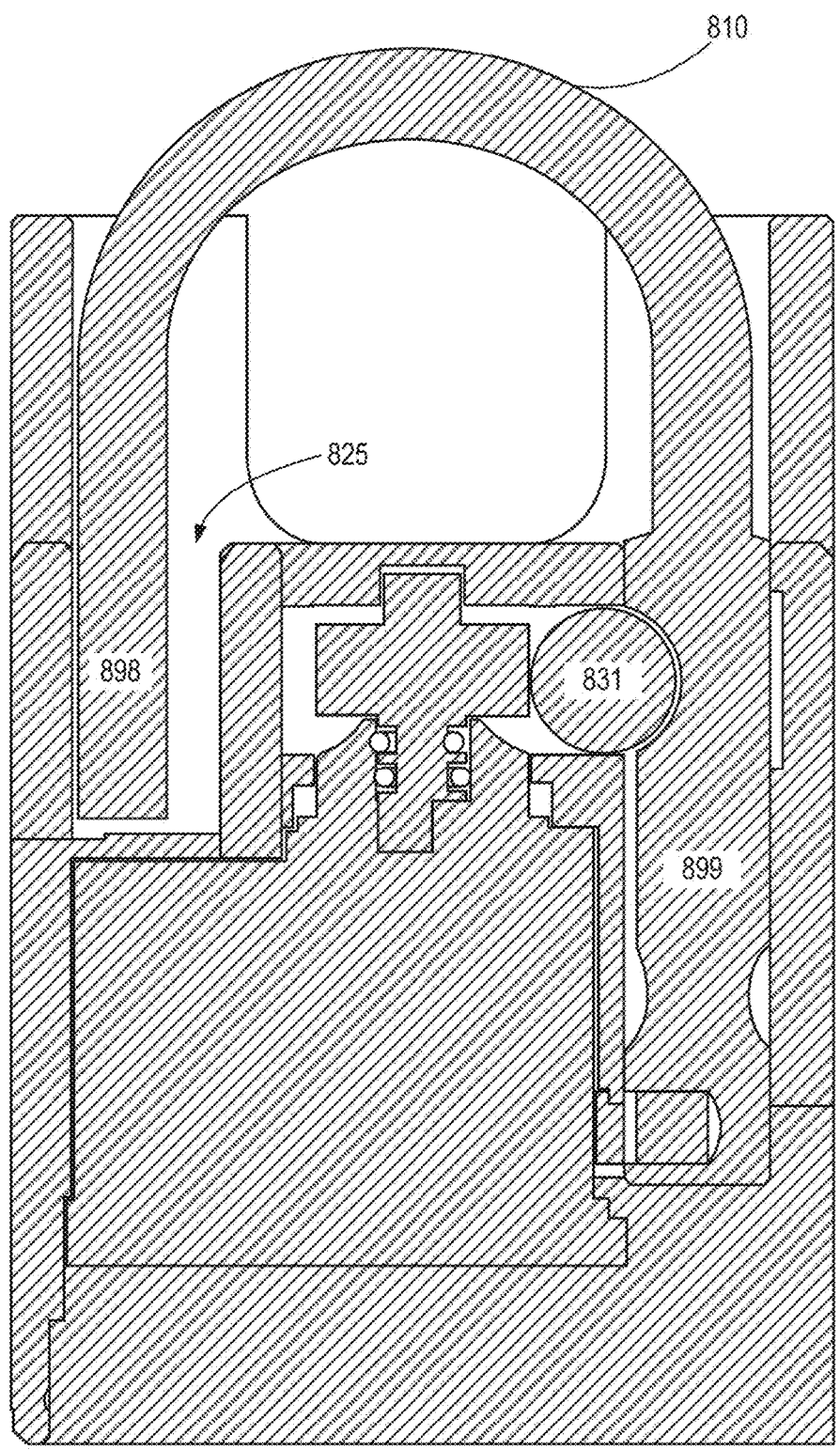
FIG. 8 illustrates an alternative embodiment in which a single ball locks the fixed side of the shackle, and the tapered end of the shackle abuts an outer rim of the aperture in the lock body, according to one embodiment.

FIG. 8 illustrates an alternative embodiment in which a single ball bearing 831 locks the distal end 899 of the shackle 810, while the tapered end 898 of the shackle 810 abuts an outer rim of a receiving aperture 825 of the lock body. FIG. 8 is highly simplified and does not illustrates many of the same components and features shown in FIG. 7B. In some embodiments, such additional components and features may be omitted. In other embodiments, FIG. 8 may be modified to include all or some of the features and components illustrated in FIG. 7B.

Figure 9:
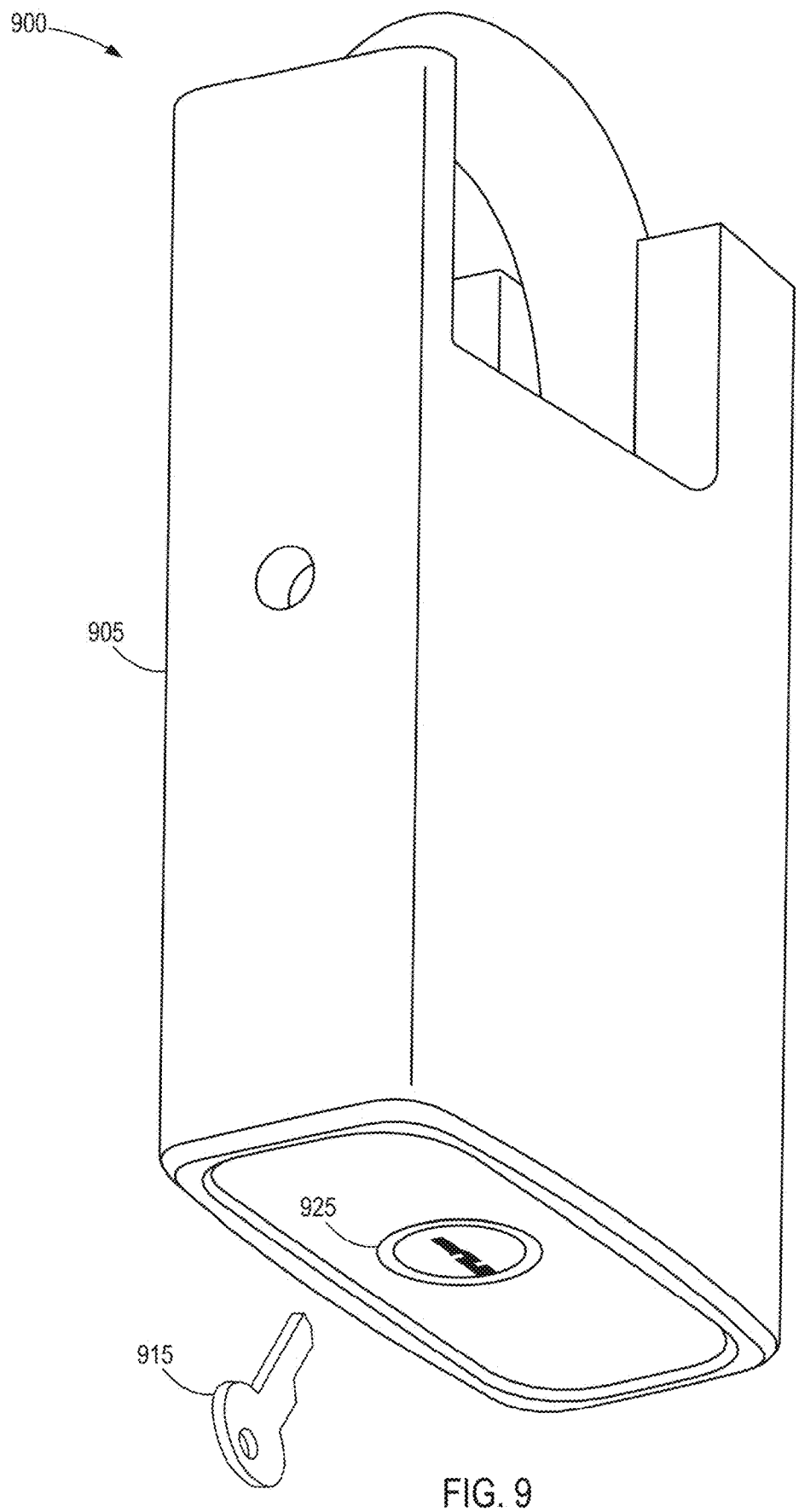
FIG. 9 illustrates a keyed embodiment of a lock with an asymmetric cam that can be rotated between locked, unlocked, and removal states, according to various embodiments.

FIG. 9 illustrates a keyed embodiment of a lock 900 with an asymmetric cam that can be rotated between locked, unlocked, and removal states. In many embodiments described herein, asymmetric cams are used in conjunction with electronic locks that are actuated via wireless signals and/or touch sensors. However, it is appreciated that an asymmetric cam may be actuated via a standard keyed lock assembly. Rotation to a first position allows the shackle to be unlocked but retained within the lock body. Rotation to a second position allows the shackle to be removed from the lock body.

Figure 10:
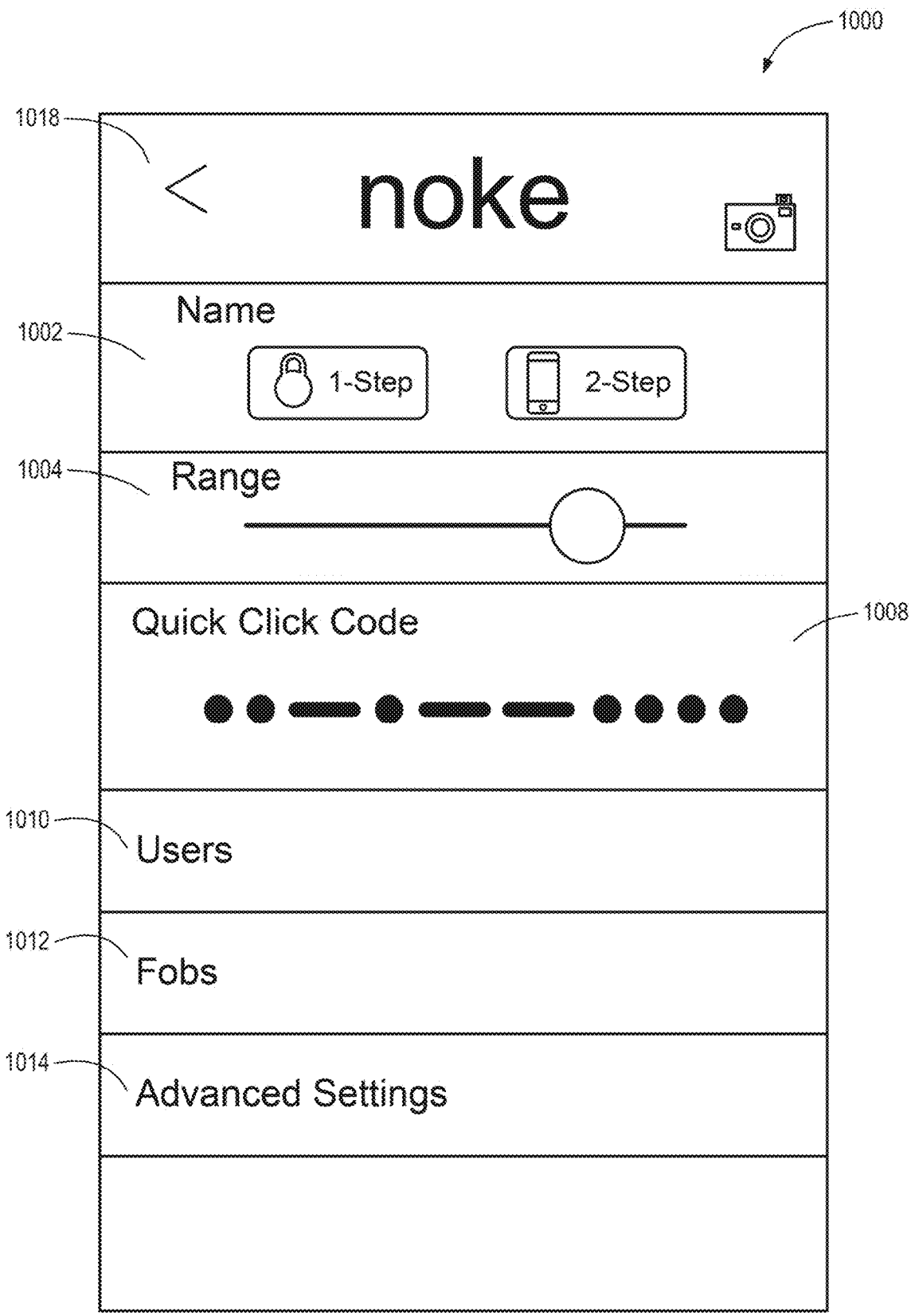
FIG. 10 illustrates a portion of an interface of a software program for actuating, controlling, and configuring a keyless electronic lock, according to one embodiment.

FIG. 10 illustrates a portion of an interface 1000 of a software program for actuating, controlling, and configuring a keyless electronic lock. A user may access an application with the illustrated interface on a laptop, computer, mobile phone, tablet, etc. In some embodiments, a user interface of the application may allow a mobile device to be paired with a wireless-enabled keyless electronic lock for faster access in the future. In some embodiments, a keyless electronic lock may be programmed with a default set of inputs for authentication. Providing such inputs may authenticate the lock, allow it to be paired, and/or allow for various configuration settings. In some embodiments, the pairing may include Bluetooth or ZigBee pairing, for example.

As illustrated, a logo of a servicing company and/or hardware manufacturing may be displayed 1018. In some embodiments, the name may be customized by the operator. In some embodiments, a picture can be added to visually associate an image with a specific log.

An authentication option 1002 may be selected as either 1-step or 2-step. In a 1-step authentication, the lock may be activated and then automatically be authenticated by the application running in the background of a mobile device. In such embodiments, users need not remove anything from the pockets or bags. With 1-step authentication, authentication occurs in a single user step. That is, activation of the lock (i.e., transitioning the lock from an idle or sleep state in which little or no power is consumed to an awake state in which the lock is listening and/or pinging mobile devices to request wireless authentication therefrom) is all that is required to authenticate the lock and allow it to be unlocked.

In 2-step authentication mode, the lock may be activated from the idle state, but the application will not automatically provide the authentication information—even if it is running in the background. Instead, the user must open the application and select an "unlock" option to send the authentication signal to the lock.

In some embodiments, a distance range 1004 may be selected by a slider or by inputting actual numbers to select a distance at which the mobile device will be able to send the authentication signal to the lock. A small range may require the user to be standing proximate the lock. A large range may allow the user to stand several feet, or even tens or hundreds of feet, from the lock and still have the authentication signal transmitted to an active lock.

For example, if Bluetooth is used, the maximum range may be about 10 meters (if the communication radius is about 10 meters). Other technologies and version of Bluetooth may allow for longer range, faster communication, and/or lower power consumption. The distance slider 1004 may be selectively moved anywhere between the minimum distance and the maximum distance on the distance scale 1004 to set the distance at which the authorized mobile device can unlock the lock. Accordingly, the distance at which an authorized mobile device can unlock the lock may be set anywhere in the range from the minimum distance to the maximum distance. In some embodiments, the distance between the authorized mobile device and the lock may be determined based, at least in part, on a received signal strength of communications between the mobile device and the lock. For example, the distance between the authorized mobile device and the lock may be based on the strength of signals received by the lock from the mobile device, the strength of signals received by the mobile device from the lock, or combinations thereof.

By way of non-limiting example, different distances between the mobile device and the lock may be correlated to different received signal strength levels (e.g., decibel power levels). A processor of the lock, a processor of the mobile device, or a combination thereof may determine the distance between the mobile device and the lock.

In some embodiments, once the authorized mobile device enters within the defined distance from the lock (e.g., which may be detected by the mobile device, the lock, or a combination thereof by a received signal strength reaching a level correlated with the defined distance), the lock may unlock (e.g., automatically upon the mobile device entering within the defined distance from the lock, after further authorization steps, etc.). In some embodiments, the lock may unlock automatically responsive to a detection of the mobile device entering within the defined distance from the lock. In some embodiments, such an automatic unlocking feature may be turned on and off by the user. In some embodiments, additional authorization may be required in addition to the mobile device entering within the defined distance. By way of non-limiting example, a predetermined series of physical interactions with the lock may be required in addition to, or instead of, the mobile device entering within the defined distance from the lock.

In some embodiments, even absent an authorized mobile device (e.g., a user forgot a mobile device or a battery of the mobile device is depleted), the lock may be unlocked using the series of physical interactions (quick-clicks). The pattern of physical interaction or quick-clicks can be displayed 1008 and modified by the user. A dot may represent a short "click" and a dash may represent a long "click." The term "quick-click," "quickclick" or "quick click" may be used in the general sense of requiring physical input interactions of some form, although they may not strictly comprise an actual "click." For example, the series or pattern of physical interactions may be provided via a button, switch, toggle, light sensor, motion sensor, resistive touch sensor, capacitive touch sensor, and/or other physical input sensors.

In one embodiment, each lock comes pre-provisioned with a series of master quick-click codes that can be used to reset the lock, unlock the lock, and/or allow for removal of the shackle. These master quick-click codes may be one-time use codes and may be provisioned only by the manufacturer, owner, and/or included in the lock at the time of purchase.

Various users can be authorized to be the owner or administrator of the lock, at 1010. For example, an administrative user can define permissions for an authorized user (and/or invite a new user to accept permissions to the lock). A lock can be identified in a title location and by a picture in a picture location. An authorized user can be identified by a user identifier (such as an email, login, name, phone number, blockchain-based identity, or other identifying information, etc.). Permissions can be tailored to the user. Permissions can be set for permanent or single use, or further refined by days, times, and/or an expiration date applicable to each user Similarly, fobs may be configured to access the lock, at 1012, and various advanced settings may be available, at 1014. For example, various tracking services and data logging information may be available. A lock can communicate with a mobile device and/or a lock application service over a network, such as a local or wide area network. Authentication may be performed in the lock, in the mobile device, and/or via a server. The server may include load balancers capable of decryption, application servers, storage, control servers, and/or a data logging service.

In some embodiments, a user can set up an account with the lock application service using an application on the mobile device. The user registers one or more locks with the application server. The lock application service can store user credentials in storage and associate the user credentials with a keyless electronic lock identifier (e.g., a unique 16-digit code) for the keyless electronic lock. The user can then invite other users to join the lock application service and grant other users permissions to the keyless electronic lock. Permissions can be restricted to days, times, a number of times, a period of time, a repeating schedule, permission to remove the shackle, and/or other restrictions on timing and use of the keyless electronic lock.

Timing restrictions may be based on the mobile device's timer or on the lock application service's timer, which can be accessed directly or via the mobile device's Internet connection. Permissions can be stored in a storage within the lock. Third parties may be given different levels of access. An owner of the keyless electronic lock may have master authority. For example, if the keyless electronic lock were used to secure a gate, the owner of the property may enable employees to enter during certain hours, but not others. The owner may restrict the employees from removing the shackle.

Permissions can be stored locally on the keyless electronic lock and/or in the lock application service. For example, when permissions are stored solely by the lock application service, the keyless electronic lock can be transitioned to an awake state by user interaction and connect to the mobile device over Bluetooth. The mobile device can transmit credentials to the keyless electronic lock. The keyless electronic lock can send the credentials (or a message based on the credentials, e.g., a cryptographic hash) to the lock application service (potentially via the mobile device) for determination of whether the mobile device is authorized to unlock the keyless electronic lock.

Authentication and/or authorization may be done directly by the keyless electronic lock or via the mobile device's Internet connection. The lock application service can transmit a message indicating authorization or failure to authorize to the keyless electronic lock and log the attempt in the logging service. If authorization is successful, the keyless electronic lock can transition to an unlocked state and allow a locking mechanism to be unlocked. If authorization is not successful, the keyless electronic lock can stay in the same state and provide an indicator of the failure (e.g., light, sound, etc.).

Alternatively, the lock application service may not be queried every time an unlock attempt is made. For example, lock application service verification for a mobile device may be required every time, hourly, daily, weekly, monthly, or never. This may be defined by the owner of the keyless electronic lock. The more secure the owner wishes the keyless electronic lock to remain, the more frequently the owner can require lock application service verification. The security level associated with the authentication frequency requirement may be represented by a sliding scale from less secure to more secure in which the most secure option may require a server or third-party authentication permission each time the keyless electronic lock is accessed. The least secure option may never require a server or third-party authentication permission.

The keyless electronic lock can determine whether the credentials match credentials available locally to the keyless electronic lock. If a match is found and the user is authorized, the keyless electronic lock can transition to an unlocked state. If the user is not authorized, the keyless electronic lock can stay in the locked state and provide an indicator of the failure (e.g., light, sound, etc.).

Logged history can be made available to a user or admin of the keyless electronic lock (e.g., an owner, an administrator, an authorized user, etc.). History can include various events, attempts, and permissions related to the keyless electronic lock. This can include the current status of the keyless electronic lock (locked, unlocked, battery power, shackle type, etc.), prior status of the keyless electronic lock, user requests received, failed attempts, successful attempts, network connectivity issues, last updates, updated permissions, accelerometer data, and/or other interactions with the keyless electronic lock or the lock application service.

This disclosure has references various embodiments, including the best mode. However, those skilled in the art will recognize that changes and modifications may be made to the embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

One aspect of this disclosure includes an electronic lock, comprising: a lock body; a motor to rotate a cam between at least a locked state and an unlocked state; control circuitry to control rotation of the motor based on an authentication signal; a shackle to be selectively locked to the lock body with the cam is in the locked state and selectively unlocked from the lock body with the cam in the unlocked state, wherein the shackle comprises a magnetic element in a distal end; and a shackle detector to detect when the shackle is inserted within the lock body in the locked state based on the proximity of the magnetic element in the distal end of the shackle, wherein the shackle detector detects the magnetic element through one of: an aperture in the lock body proximate the shackle detector, and an electromagnetically transparent window in the lock body proximate the shackle detector.

What is claimed is:

1. A lock, comprising:
a lock body;
a shackle to be selectively locked, unlocked, and removed from the lock body;
at least one ball bearing;
an asymmetric cam rotatable between:
  a locked state in which the ball bearing secures the shackle within the lock body via at least one lock notch in the shackle,
  an unlocked state in which the ball bearing is released from the lock notch to unlock the shackle and engages a revolved notch on a distal end of the shackle to prevent removal of the shackle from the lock body, and
  a removal state in which the ball bearing is released from the lock notch and the revolved notch to allow the shackle to be removed from the lock body; and
  a lock assembly connected to the asymmetric cam, a control circuit of the lock assembly configured to control access to rotation of the asymmetric cam based on an authentication signal,
wherein the lock body further comprises a shackle detector to detect when the shackle is inserted within the lock body in the locked state.

2. The lock of claim 1, wherein the lock assembly comprises a wirelessly-enabled lock assembly to enable rotation of the asymmetric cam via a motor based on a wirelessly-transmitted unlock signal.

3. The lock of claim 2, further comprising a computer-implemented software application that enables:
a standard user to send a wireless signal to rotate the asymmetric cam to the unlocked state, and
an admin user to send a wireless signal to rotate the asymmetric cam to the removal state.

4. The lock of claim 1, wherein the lock assembly comprises a touch sensor to detect an encoded series of touch inputs to control rotation of the asymmetric cam via a motor.

5. The lock of claim 4, wherein the encoded series of touch inputs comprises a pattern of short actuations and long actuations of the touch sensor.

6. The lock of claim 5, wherein the touch sensor comprises a capacitive touch sensor.

7. The lock of claim 5, wherein the touch sensor comprises an electrically actuated button.

8. The lock of claim 1, wherein the shackle can be replaced with a replacement shackle having a base portion and a tapered portion, wherein the base portion of the replacement shackle has a diameter, lock notch, and revolved notch similar to that of the shackle, and wherein the tapered portion has a narrower diameter.

9. The lock of claim 1, wherein the asymmetrical cam comprises opposing convex surfaces to contact dual ball bearings in the locked state, and opposing concave recesses to allow the dual ball bearings to retract from dual lock notches in the shackle.

10. An electronic lock, comprising:
a lock body;
a motor to rotate a cam between at least a locked state and an unlocked state; a shackle to be selectively locked to the lock body with the cam is in the locked state and selectively unlocked from the lock body with the cam in the unlocked state;
control circuitry to control rotation of the motor based on an authentication signal;
an internal battery to supply power to the motor and control circuitry, wherein the internal battery cannot be removed or replaced when the shackle is in the locked state; and
externally accessible electrical contacts to enable an external battery to be directly connected without wires to the electronic lock to provide power to the control circuitry and motor at least when the internal battery is discharged,
wherein the lock body further comprises a shackle detector to detect when the shackle is inserted within the lock body in the locked state.

11. The electronic lock of claim 10, further comprising at least one ball bearing,
wherein the shackle is further configured to be selectively removed from the lock body in addition to being locked and unlocked, and
wherein the cam comprises an asymmetric cam rotatable between:
  a locked state in which the ball bearing secures the shackle within the lock body via at least one lock notch in the shackle,
  an unlocked state in which the ball bearing is released from the lock notch to unlock the shackle and engage a revolved notch on a distal end of the shackle to prevent removal of the shackle from the lock body, and
  a removal state in which the ball bearing is released from the lock notch and the revolved notch to allow the shackle to be removed from the lock body.

12. The electronic lock of claim 11, wherein the control circuitry comprises a Bluetooth-enabled control circuitry to enable rotation of the asymmetric cam via the motor based on a wirelessly-transmitted authentication signal.

13. The electronic lock of claim 11, wherein the control circuitry comprises a touch sensor to detect an encoded series of touch inputs to control rotation of the asymmetric cam via a motor.

14. The electronic lock of claim 13, wherein the encoded series of touch inputs comprises a pattern of short actuations and long actuations of the touch sensor.

15. The electronic lock of claim 14, wherein the touch sensor comprises a capacitive touch sensor.

16. The electronic lock of claim 10, wherein the externally accessible electrical contacts are spaced to receive connectors from a nine-volt battery, and wherein the electronic lock further comprises circuitry to allow the nine-volt battery to be connected in either polarity.

17. The electronic lock of claim 10, wherein the shackle comprises a magnetic element in a distal end, and the shackle detector comprises circuitry to detect the magnetic element through one of: an aperture in the lock body proximate the shackle detector, and an electromagnetically transparent window in the lock body proximate the shackle detector.

18. A lock, comprising:
a lock body to selectively receive one of a plurality of interchangeable shackles;
a first interchangeable shackle with a uniform diameter to be selectively locked, unlocked, and removed from the lock body;
a second interchangeable shackle to be selectively locked, unlocked, and removed from the lock body, wherein a base portion of the second interchangeable shackle has a diameter equal to that of the first interchangeable shackle, and wherein a tapered portion of the second interchangeable shackle has a diameter less than that of the first interchangeable shackle; and
a tubular spacer to be selectively inserted within the lock body to receive the tapered portion of the second interchangeable shackle therein, and selectively removed from the lock body for the lock body to receive the first interchangeable shackle.

* * * * *